United States Patent
Gandenberger

(10) Patent No.: US 11,119,472 B2
(45) Date of Patent: Sep. 14, 2021

(54) COMPUTER SYSTEM AND METHOD FOR EVALUATING AN EVENT PREDICTION MODEL

(71) Applicant: Uptake Technologies, Inc., Chicago, IL (US)

(72) Inventor: Greg Gandenberger, Mt. Prospect, IL (US)

(73) Assignee: Uptake Technologies, Inc., Chicago, IL (US)

( * ) Notice: Subject to any disclaimer, the term of this patent is extended or adjusted under 35 U.S.C. 154(b) by 252 days.

(21) Appl. No.: 16/146,895

(22) Filed: Sep. 28, 2018

(65) Prior Publication Data
US 2020/0103886 A1    Apr. 2, 2020

(51) Int. Cl.
G05B 23/02     (2006.01)
G05B 13/04     (2006.01)

(52) U.S. Cl.
CPC ......... *G05B 23/0256* (2013.01); *G05B 13/04* (2013.01); *G05B 23/024* (2013.01); *G05B 23/0243* (2013.01)

(58) Field of Classification Search
None
See application file for complete search history.

(56) References Cited

U.S. PATENT DOCUMENTS 5,566,092 A    10/1996    Wang et al.
5,633,800 A    5/1997     Bankert et al.
5,893,069 A *  4/1999     White, Jr. ............... G06Q 10/06
                                                      705/348
6,256,594 B1   7/2001     Yamamoto et al.
6,336,065 B1   1/2002     Gibson et al.
(Continued)

FOREIGN PATENT DOCUMENTS

WO    2011117570    9/2011
WO    2013034420    3/2013
(Continued)

OTHER PUBLICATIONS

Brad Cline et al., Predictive Maintenance Applications for Machine Learning, 2017, 978-1-5090-5284-4/17/ IEEE, downloaded from IEEE Xplore (Year: 2017).*

(Continued)

*Primary Examiner* — Eman A Alkafawi
*Assistant Examiner* — Denise R Karavias
(74) *Attorney, Agent, or Firm* — Lee Sullivan Shea & Smith LLP

(57) ABSTRACT

When two event prediction models produce different numbers of catches, a computer system may be configured to determine which of the two models has the higher net value based on how a "Break-Even Alert Value Ratio" for the models compares to an estimate of the how many false flags are worth trading for one catch. Further, when comparing two event prediction models, a computer system may be configured to determine "catch equivalents" and "false-flag equivalents" numbers for the two different models based on potential-value and impact scores assigned to the models' predictions, and the computing system then use these "catch equivalents" and "false-flag equivalents" numbers in place of "catch" and "false flag" numbers that may be determined using other approaches.

20 Claims, 15 Drawing Sheets

(56) References Cited

U.S. PATENT DOCUMENTS

| | | |
|---|---|---|
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,698,055 B2 * | 4/2010 | Horvitz ............... G08G 1/0104 701/117 |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,214,308 B2 * | 7/2012 | Chu ..................... G06N 5/02 706/14 |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0065409 A1 * | 4/2003 | Raeth ................. G05B 23/0254 700/31 |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2015/0286692 A1 * | 10/2015 | Umetani ............... G06Q 10/04 707/722 |
| 2017/0090068 A1 * | 3/2017 | Xiang ..................... E02D 1/04 |
| 2017/0351241 A1 * | 12/2017 | Bowers ................ G05B 19/406 |
| 2018/0114139 A1 * | 4/2018 | Kucera ................. G06N 20/00 |
| 2020/0111111 A1 * | 4/2020 | Suzuki .................. G08G 1/123 |

FOREIGN PATENT DOCUMENTS

| | | |
|---|---|---|
| WO | 2014145977 | 9/2014 |
| WO | 2014205497 | 12/2014 |

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

(56) References Cited

OTHER PUBLICATIONS

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

* cited by examiner

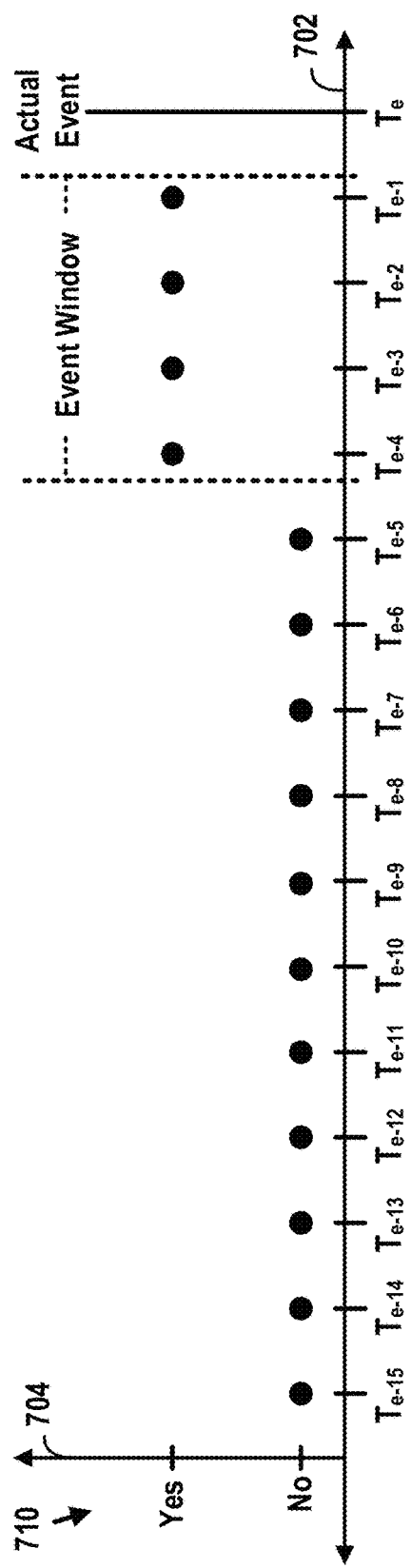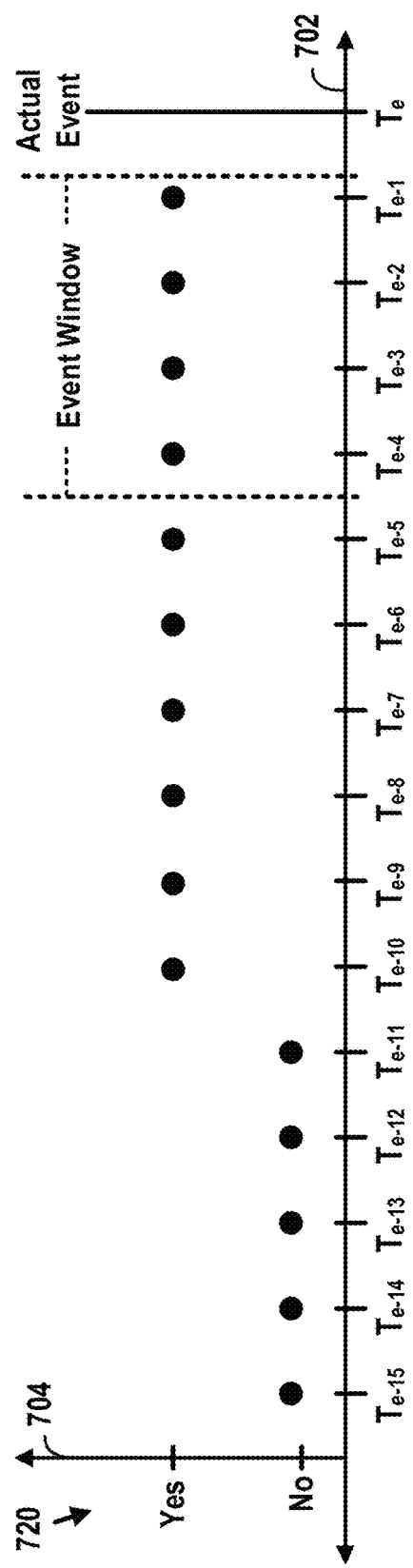
FIG. 7A
FIG. 7B

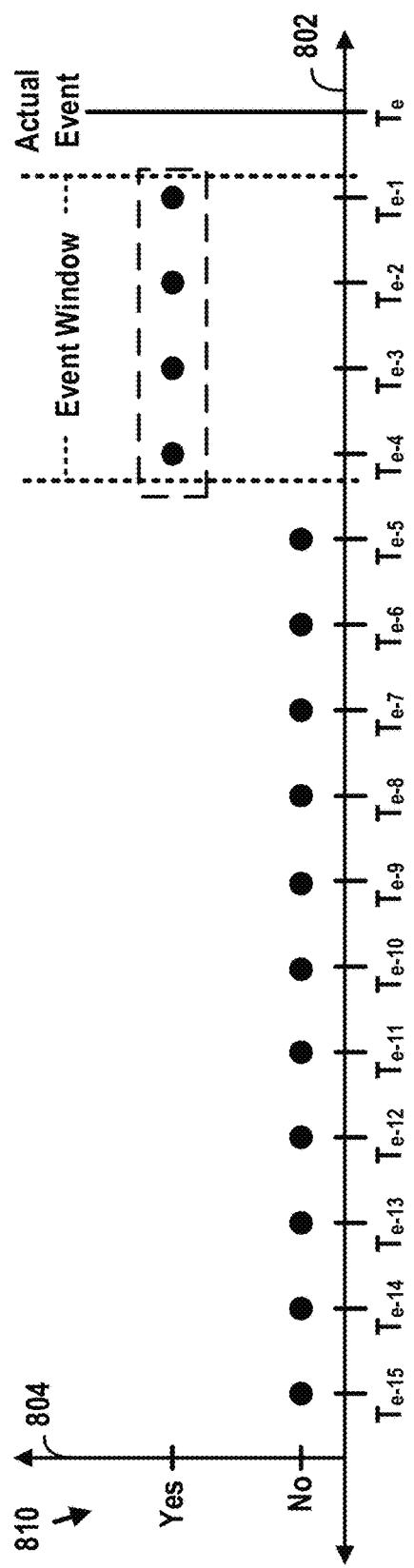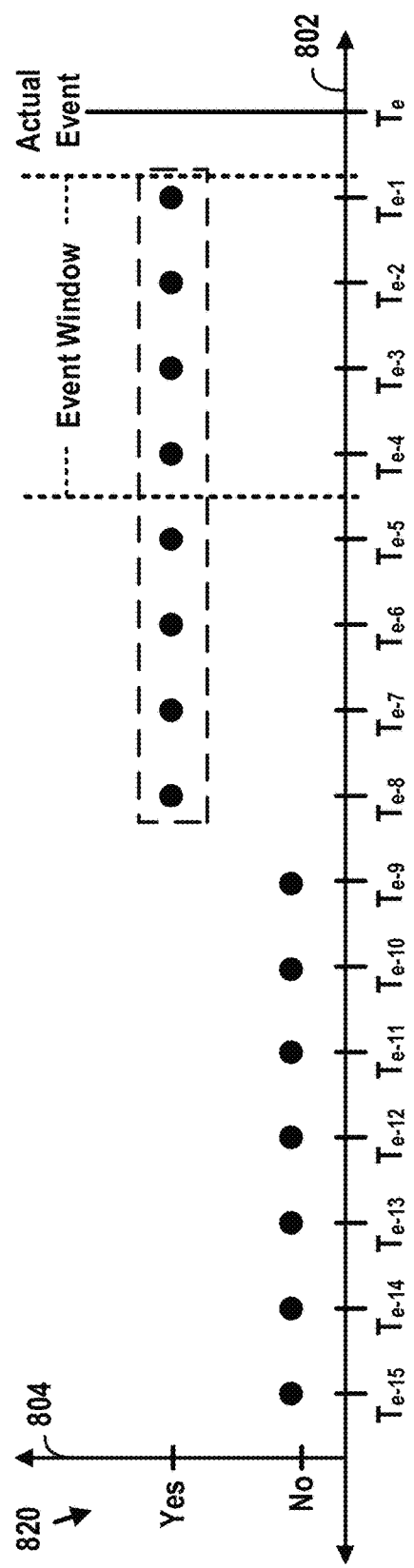
FIG. 8A
FIG. 8B

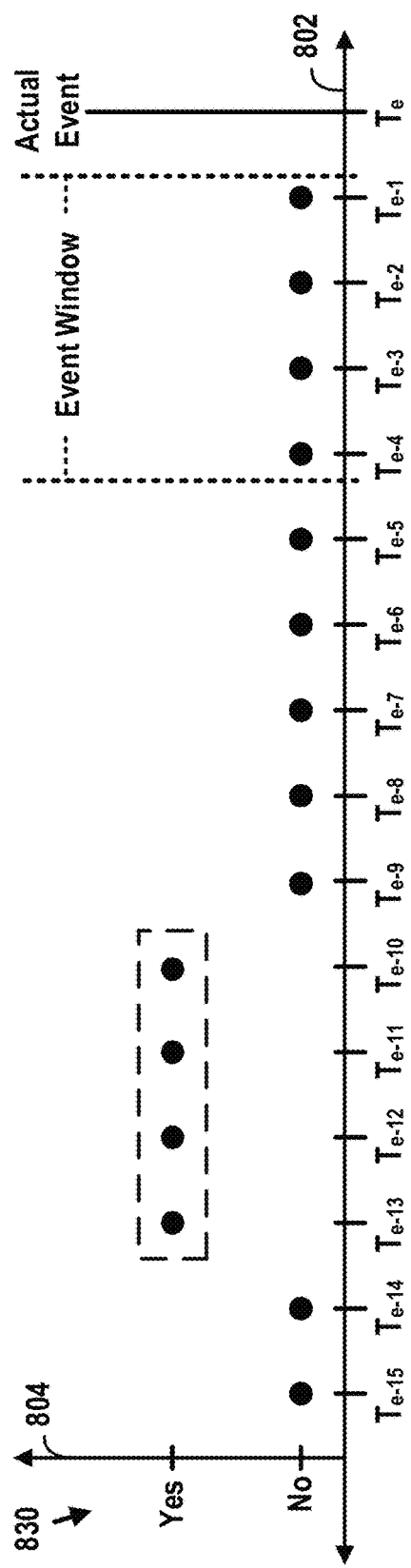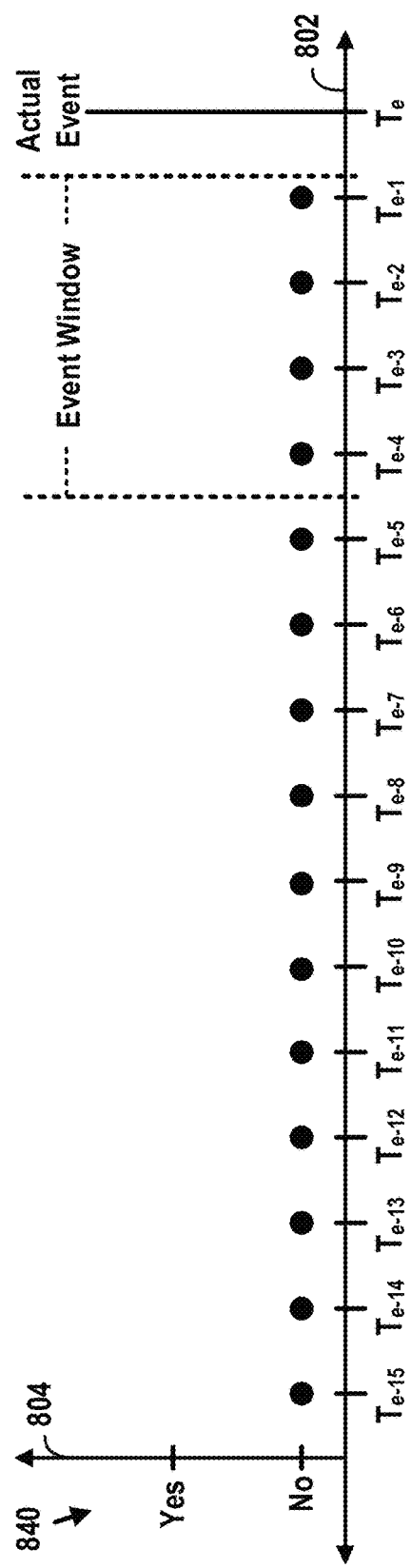
FIG. 8C
FIG. 8D

COMPUTER SYSTEM AND METHOD FOR EVALUATING AN EVENT PREDICTION MODEL

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

OVERVIEW

In recent years, one primary area of focus for a data analytics platform has become the preemptive prediction of certain types of event occurrences that impact asset operation, such as occurrences of failures on an asset. The main reason that preemptive prediction of event occurrences has become an area of focus is because unexpected occurrences of certain types of events may result in significant consequences. For instance, if a failure occurs on an asset while it is in use, this may increase the time and/or cost necessary to get the asset back to an operational state, decrease productivity during the downtime, and potentially present a safety risk to individuals in proximity to the asset at the time that it fails.

In view of the foregoing, significant time, effort, and resources are now being dedicated to creating and deploying event prediction models that are configured to predict whether event occurrences are forthcoming and then preemptively notify a user of forthcoming event occurrences sufficiently in advance of when such event occurrences actually happen, so that action can be taken to address the event occurrences before they actually happens. In this way, an event prediction model may help to mitigate the costs that may otherwise result from an unexpected occurrence of an undesirable event like an asset failure—such as an increase in maintenance cost and/or a decrease in productivity—and may thus provide a positive net business value.

However, it should be understood that the business value provided by an event prediction model depends in part on timing of the model's a preemptive prediction of an event occurrence relative to the actual time of the event occurrence. Indeed, an event prediction model that outputs a preemptive prediction of an event occurrence too far in advance of the actual time of the event occurrence may lead a user to prematurely take action that ends up being unnecessary, which has an associated cost that offsets the benefit provided by the event prediction model. On the other hand, an event prediction model that outputs a preemptive notification of an event occurrence too close to the actual time of the event occurrence may not give a user sufficient time to address the event occurrence, which limits the benefit provided the event prediction model.

In view of the foregoing, one way to evaluate an event prediction model is through the use of an "event window," which is a particular window of time preceding an actual event occurrence during which a preemptive prediction of an event occurrence of the given type is considered to provide a threshold level of net value (e.g., either a maximum net value or a net value greater than 0). In this respect, the beginning of an event window for an event occurrence of the given type may be set to the earliest time (relative to the actual time of the event occurrence) at which a preemptive notification of the event occurrence still provides the threshold level of net value, while the end of the event window for the event occurrence of the given type may be set to the latest time (relative to the actual time of the event occurrence) at which a preemptive notification of the event occurrence still provides the threshold level of net value.

Using an event window, the individual predictions output by an event prediction model can be classified into four categories: (1) a "true positive," which is an individual prediction that an event occurrence of the given type is forthcoming (i.e., a positive prediction) that falls within an event window preceding an actual event occurrence such that the prediction is deemed to be correct, (2) a "false positive," which is an individual prediction that an event occurrence of the given type is forthcoming (i.e., a positive prediction) that falls outside of any event window preceding an actual event occurrence such that the prediction is deemed to be incorrect, (3) a "true negative," which is an individual prediction that an event occurrence of the given type is not forthcoming (i.e., a negative prediction) that falls outside of any event window preceding an actual event occurrence such that the prediction is deemed to be correct, and (4) a "false negative," which is an individual prediction that an event occurrence of the given type is not forthcoming (i.e., a negative prediction) that falls within an event window preceding an actual event occurrence such that the prediction is deemed to be incorrect.

In turn, this classification may be used as a basis for determining various metrics that characterize aspects of the event prediction model's performance. Two examples of these metrics are (1) "precision," which indicates which percentage of "positive" predictions output by the event prediction model actually turned out to be correct, and (2) "recall," which indicates what percentage of the event prediction model's outputs that should have been "positive" predictions actually were "positive" predictions. However, because each of these metrics only provides insight into one specific aspect of an event prediction model's performance, neither of these metrics standing alone can be used to provide a reliable comparison between different event prediction models. Indeed, an event prediction model that only outputs positive predictions when it is extremely confident may provide perfect "precision," but may output too many false negatives to be considered useful. On the other hand, an event prediction model that always outputs positive predictions may provide perfect "recall," but the model's outputs would have no meaning at all.

As such, existing approaches for evaluating event prediction models typically attempt to combine precision and recall into a single metric that is intended to represent the performance of an event prediction model. One such combined metric may take the form of an F-beta score, which constitutes a weighted harmonic average of precision and recall, where one of these metrics (typically recall) is weighted more heavily than the other. However, even if a set of different event prediction models are each assigned a respective F-beta score, attempting to use the different event prediction models' respective F-beta scores to determine which of the different event models is "better" tends to lead to inconsistent and suboptimal results. There are at least two reasons for this.

First, given that precision and recall characterize different aspects of an event prediction model's performance that are not necessarily represented on the same scale, it is difficult to properly weight (or "tune") these metrics when combining them into a single metric like F-beta score. As a result, the F-beta scores that are assigned to different models tend to be difficult to interpret, and generally do not serve as a reliable basis for determining which of several different event prediction models is "better."

Second, metrics such as precision, recall, and F-beta do not sufficiently reflect the business value provided by an event prediction model, in terms of the net benefit achieved as a result of a correct, preemptive prediction of an event occurrence or the net cost incurred as a result of an incorrect, preemptive prediction of an event occurrence. For this additional reason, metrics such a precision, recall, and F-beta generally do not serve as a reliable basis for determining which of several different event prediction models is "better."

Due to these and other problems with existing technology for evaluating and comparing the performance of event prediction models, there is a need for technology that enables a data analytics platform to carry out a more reliable comparison of event prediction models that sufficiently accounts for the business value provided by the event prediction models. In view of this need, disclosed herein is a new approach for comparing different event prediction models that are configured to preemptively predict event occurrences of the same given type, which may be carried out by a data analytics platform.

According to an example embodiment, the disclosed approach for comparing different event prediction models may begin with the data analytics platform applying each of the different event prediction models to a given set of test data that comprises historical time-series values for a set of input variables from a period of time during which there are known instances of actual event occurrences of the given type, which may result in each of the different event prediction models outputting a respective set of predictions of whether an event occurrence of the given type is forthcoming.

Next, the data analytics platform may evaluate the set of predictions output by each of the different event prediction models using event windows for the known instances of actual event occurrences, and while performing this evaluation, may determine a respective number of "catches" and a respective number of "false flags" produced by each of the different event prediction models (where a "catch" is generally defined as a correct prediction that an event occurrence is forthcoming and a "false flag" is generally defined as an incorrect prediction that an event occurrence is forthcoming). In this respect, the "catch" and "false flag" numbers may be determined using any of various different approaches, which are described in further detail below.

After determining the respective number of catches and the respective number of false flags produced by each of the different event prediction models, the data analytics platform may use this information to perform a relative comparison of the different event prediction models and thereby determine which of the different event prediction models provides the highest net value. For instance, the data analytics platform may begin by selecting an initial pair of the different event prediction models and comparing the respective "catch" numbers produced by the two event prediction models in the pair. In this respect, if the respective catch numbers produced by the two event prediction models in the pair are the same, then the data analytics platform may identify whichever one of the event prediction models in the pair produced a lower number of false flags as the event prediction model in the pair that provides a higher net value.

On the other hand, if the data analytics platform determines that the respective catch numbers produced by the two event prediction models in the pair are different such that a first one of the event prediction models in the pair produced a higher number of catches than a second one of the event prediction models in the pair, then the data analytics platform may determine an indication of how many additional false flags are produced by the first one of the event prediction models relative to the second one of the event prediction models in order for the first one of the event prediction models to produce each additional catch, which may be referred to as the "Break-Even Alert Value Ratio" of the two event prediction models (or "BEAVR" for short). In practice, the data analytics platform may determine the BEAVR for the two event prediction models in the pair by (a) calculating a first difference between the respective number of false flags produced by the first one of the event prediction models in the pair and the respective number of false flags produced by the second one of the event prediction models in the pair, (b) calculating a second difference between the respective number of catches produced by the first one of the event prediction models in the pair and the respective number of catches produced by the second one of the event prediction models in the pair, and then (c) dividing the first difference by the second difference. Notably, unlike existing metrics such as precision, recall, and F-beta, the new BEAVR metric that is determined and used as part of the disclosed process provides a measure of one event predictions model's performance relative to another event prediction model.

Once the BEAVR is determined between the two event prediction models in the pair, the data analytics platform may in turn compare the BEAVR to an estimate of how many false flags are worth trading for one catch, which is one way to represent the ratio between the estimated net benefit of a catch and the estimated net cost of a false flag for an event occurrence of the given type. Based on this comparison, the data analytics platform may either (1) identify the first one of the event prediction models (i.e., the model that produced the higher number of catches) as the event prediction model in the pair that provides a higher net value if the BEAVR is less than the estimate of how many false flags are worth trading for one catch or (2) identify the second one of the event prediction models (i.e., the model that produced the lower number of catches) as the event prediction model in the pair that provides a higher net value if the BEAVR is greater than or equal to the estimate of how many false flags are worth trading for one catch.

After identifying which of the two event prediction models in the initial pair provides a higher net value, the data analytics platform may determine whether there are any other event prediction models to evaluate. If not, the data analytics platform may determine that the identified event prediction model from the initial pair provides the highest net value of the different event prediction models under consideration. On the other hand, if there is at least one other event prediction model to evaluate, the data analytics platform may then perform a similar comparison for a new pair of event prediction models that includes the identified event prediction model from the initial pair and another event prediction model that is yet to be evaluated, which may result in the data analytics platform identifying which of these two event prediction models has a higher net value. The data analytics platform may then continue in this manner until there is no event prediction model left to be evaluated, at which point the data analytics platform may determine that the event prediction model identified as providing a higher net value in the final pair is also the model that provides the highest net value of the different event prediction models under consideration.

After using the foregoing process to determine which of the different event prediction models provides the highest net value—which may be referred to herein as the "selected event prediction model"—the data analytics platform may then take one or more actions based on this determination. For instance, as one possibility, the data analytics platform may responsively deploy the selected event prediction model. As another possibility, the data analytics platform may use the disclosed process again to compare the selected event prediction model to the existing mechanism being used to monitor for forthcoming event occurrences of the given type (which could take the form of an existing event prediction model, periodic evaluation by a user, or no mechanism at all), and if this comparison yields a determination that the selected event prediction model provides a higher net value than the existing mechanism, the data analytics platform may then responsively deploy the selected event prediction model. As yet another possibility, the data analytics platform may cause an indication of the platform's determination to be presented to a user, such as an individual responsible for creating and/or deploying an event prediction model that is configured to preemptively predict event occurrences of the given type. The data analytics platform may use the determination of which event prediction model has the highest net value as a basis for taking other actions as well.

Advantageously, the disclosed approach for comparing different event prediction models that are configured to preemptively predict event occurrences of the same given type improves upon the existing technology for evaluating and comparing event prediction models, which suffers from all of the problems discussed above. For instance, unlike the existing technology for evaluating and comparing event prediction models, the disclosed approach enables a data analytics platform to perform a relative comparison of different event prediction models that sufficiently accounts for the business value provided by the event prediction models. Other advantages of the disclosed approach exist as well.

In accordance with the present disclosure, the disclosed approach for comparing different event prediction models that are configured to preemptively predict event occurrences of the same given type may also be combined with a new approach for counting catches and false flags produced by the different event prediction models, which may provide further improvements over the existing technology for evaluating and comparing event prediction models.

Indeed, one possible way to determine the number of catches and false flags produced by an event prediction model is by counting catches and false flags on an individual prediction-by-prediction basis, such that each individual "true positive" prediction is counted as a separate catch and each individual "false positive" prediction is counted as a separate false flag. However, this approach for counting catches and false flags treats each individual positive prediction as though it provides the same net value, which fails to account for the fact that the net value provided by a given positive prediction depends in part on the "impact" of the given positive prediction (i.e., how effective the given positive prediction is at capturing the user's attention), and this impact typically varies depending on the nature of the one or more predictions that immediately preceded the given positive prediction. As such, counting catches and flags using an approach where each individual positive prediction is treated as though it provides the same net value tends to attribute too much net benefit to sequences of consecutive positive predictions that fall within an event window and too much net cost to sequences of consecutive positive predictions that fall outside of an event window, which could skew the comparison between different event prediction models.

To avoid this potential problem with counting catches and false flags on an individual prediction-by-prediction basis, another possible way to determine the number of catches and false flags produced by an event prediction model is by grouping individual positive predictions into "alerts" and then counting catches and false flags on an alert-by-alert basis. One advantage of this approach is that, by treating sequences of positive predictions as a single positive prediction "unit" for purposes of evaluating the performance of the event prediction model, the issues associated with treating each individual positive prediction as though it provides the same net value may be avoided. Indeed, under this approach, a sequence of consecutive positive predictions is treated as a single catch—and is collectively afforded the same net value—regardless of how many individual positive predictions are within the sequence. However, this approach for counting catches and false flags tends to count catches and false flags at too coarse a level, which may obscure differences in the accuracy (and thus the net value) of different event prediction models.

One example of this problem can be seen when comparing (1) a first event prediction model that tends to begin outputting a sequence of positive predictions for an actual event occurrence right at the start of an event window for the actual event occurrence with (2) a second event prediction model that tends to begin outputting a sequence of positive predictions for an actual event occurrence several time units before an event window for the actual event occurrence begins. In this respect, counting catches and false flags on an alert-by-alert basis may result in a determination that these two event prediction models produced the same number of catches and false flags and thus provide equal net value—which obscures the fact that the second event prediction model began to output the alert before the event window began (which degrades the net value of the alert) whereas the first event prediction model began to output the alert right at the start of the event window (which results in a maximum net value).

Another more extreme example of the problem associated with an approach that counts catches and false flags on an alert-by-alert basis is illustrated by an event prediction model that constantly outputs positive predictions when applied to a set of test data that corresponds to at least one actual event occurrence. Indeed, under this approach, such an event prediction model would be considered to output one single alert, and would be determined to produce 1 catch and 0 false flags despite the fact that the majority of the model's individual positive predictions would be considered false flags if counted on an individual prediction-by-prediction basis.

To address these and other problems with the foregoing approaches, also disclosed herein is a new approach for counting catches and false flags in a sequence of predictions output by an event prediction model that better accounts for the net value of the predictions output by the event prediction model by evaluating both the potential net value of the predictions (e.g., in terms of correctly notifying a user that an event occurrence is forthcoming) and also the impact of the predictions (e.g., in terms of effectively capturing the user's attention with a prediction).

According to an example embodiment, the disclosed approach for counting catches and false flags may begin with the data analytics platform applying the event prediction model to a given set of test data that comprises historical time-series values for a set of input variables from a period of time during which there are known instances of actual event occurrences of the given type, which may result in the event prediction model outputting a respective set of predictions of whether an event occurrence of the given type is forthcoming.

Next, the data analytics platform may evaluate the set of predictions output by each of the different event prediction models using event windows for the known instances of actual event occurrences, and while performing this evaluation, may assign each individual prediction in the set two types of "scores." First, the data analytics platform may assign each prediction a "potential value" score, which generally serves as a measure of the potential net value of an individual prediction assuming a maximum possible impact and depends on when the prediction was output relative to an event window of an actual event occurrence. Second, the data analytics platform may assign each prediction an "impact" score, which generally serves as a measure of the impact of an individual prediction (e.g., in terms of effectively capturing a user's attention) and depends on (1) the outcome of the prediction (i.e., whether it was positive or negative) and (2) how the prediction relates to one or more preceding predictions output by the event predication model.

After the data analytics platform has assigned a "potential value" score and an "impact" score to each individual prediction output by the event prediction model, the data analytics platform may use these scores to determine a number of "catch equivalents" and a number of "false flag equivalents" produced by the event prediction model, where these "catch equivalents" and "false flag equivalents" numbers may be used in place of the "catch" and "false flag" numbers that may be determined using other counting approaches. In this respect, the manner in which the assigned "potential value" and "impact" scores are used to determine the "catch equivalents" and "false flag equivalents" numbers produced by the event prediction model may take various forms.

In one implementation, the data analytics platform may determine the number of catch equivalents produced by the event prediction model by (1) identifying the individual predictions output by the event prediction model that have been assigned positive "potential value" scores, which are deemed to be the "catch" predictions, (2) for each "catch" prediction, multiply the prediction's assigned "potential value" score by its assigned "impact" score, which may produce an "actual value" score for the prediction (i.e., a measure of the actual net value provided by the prediction that takes both the potential net value and the actual impact of the prediction into account), and (3) aggregate the "actual value" scores for the "catch" predictions to produce the total number of catch equivalents produced by the event prediction model.

In turn, the data analytics platform may determine the number of false flag equivalents produced by the event prediction model by (1) identifying the individual predictions output by the event prediction model that have been assigned negative "potential value" scores, which are deemed to be the "false flag" predictions, (2) for each "false flag" prediction, multiply the prediction's assigned "potential value" score by its assigned "impact" score, which may produce an "actual value" score for the prediction (i.e., a measure of the actual net value provided by the prediction takes both the potential net value and the actual impact of the prediction into account), and (3) aggregate the "actual value" scores for the "false flag" predictions to produce the total number of false flag equivalents produced by the event prediction model.

Once the data analytics platform has determined the number of "catch equivalents" and the number of "false flag equivalents" produced by the event prediction model, the data analytics platform may then use these "catch equivalents" and "false flag equivalents" numbers in any of the same ways that the data analytics platform may otherwise use "catch" and "false flag" numbers for an event prediction model, including for purposes of evaluating and/or comparing event prediction models. For example, the data analytics platform may use "catch equivalents" and "false flag equivalents" numbers determined using the disclosed counting approach in place of "catch" and "false flag" numbers determined using another counting approach when performing the disclosed process of comparing different event prediction models to determine which of the different event prediction models provides the highest net value. As another example, the data analytics platform may use "catch equivalents" and "false flag equivalents" numbers determined using the disclosed counting approach in place of "catch" and "false flag" numbers determined using another counting approach when providing a user with information regarding the performance of an event prediction model. Other examples are also possible.

Accordingly, in one aspect, disclosed herein are methods that improve upon existing technology for evaluating event prediction models. One such method may involve (i) applying each of two different event prediction models to a set of test data associated with known instances of actual event occurrences of a given type, wherein each of the two different event prediction models is configured to preemptively predict event occurrences of the given type, and wherein the applying results in each of the two different event prediction models outputting a respective set of predictions of whether an event occurrence of the given type is forthcoming, (ii) while evaluating the respective set of predictions output by each of the two different event prediction models using event windows for the known instances of actual event occurrences, determining a respective number of catches and a respective number of false flags produced by each of the two different event prediction models, (iii) based on the respective number of catches and the respective number of false flags produced by each of the two different event prediction models, identifying which given one of the two different event prediction models provides a higher net value by determining whether the respective numbers of catches produced by the two different event prediction models are the same or different and then (a) if the respective numbers of catches produced by the two different event prediction models are determined to be the same, identifying whichever one of the two different event prediction models produced a lesser number of false flags as the given one of the two different event prediction models, or (b) if the respective numbers of catches produced by the two different event prediction models are determined to be different such that a first one of the two different event prediction models produced a greater number of catches than a second one of the two different event prediction models, determining a ratio between (1) a first difference between the respective number of false flags produced by the first one of the two different event prediction models and the respective number of false flags produced by the second one of the two different event prediction model and (2) a second difference between the respective number of catches produced by the first one of the two different event prediction models and the respective number of catches produced by the second one of the two different event prediction models, and determining whether the ratio is less than an estimate of the how many false flags are worth trading for one catch, and then (1) if the ratio is less than the estimate, identifying the first one of the two different event prediction models as the given one of the two different event prediction models, or (2) if the ratio is not less than the estimate, identifying the second one of the two different event prediction models as the given one of the two different event prediction models, and (iv) after identifying the given one of the two different event prediction models that provides the higher net value, causing a client station associated with a given user to present an indication that the given one of the two different event prediction models provides the higher net value.

Another such method may involve (i) applying an event prediction model to a set of test data associated with known instances of actual event occurrences of a given type, wherein the event prediction model is configured to preemptively predict event occurrences of the given type, and wherein the applying results in the event prediction model outputting a set of predictions of whether an event occurrence of the given type is forthcoming, (ii) while evaluating the respective set of predictions output by the event prediction model using event windows for the known instances of actual event occurrences, determining a number of catch equivalents and a number of false-flag equivalents produced by the event prediction model by (a) assigning each prediction in the set of predictions output by the event prediction model a respective potential-value score and a respective impact score, (b) determining the number of catch equivalents produced by the event prediction model by (1) identifying a first subset of the set of predictions output by the event prediction model that have been assigned positive potential-value scores, (2) for each respective prediction in the first subset, determining a respective actual-value score for the respective prediction by multiplying the respective potential-value score assigned to the respective prediction by the respective impact score assigned to the respective prediction, and (3) aggregating the respective actual-value scores for the respective predictions in the first subset to produce a total actual-value score for the first subset, wherein the total actual-value score for the first subset comprises the number of catch equivalents produced by the event prediction model, and (c) determining the number of false-flag equivalents produced by the event prediction model by (1) identifying a second subset of the set of predictions output by the event prediction model that have been assigned negative potential-value scores, (2) for each respective prediction in the second subset, determining a respective actual-value score for the respective prediction by multiplying the respective potential-value score assigned to the respective prediction by the respective impact score assigned to the respective prediction, and (3) aggregating the respective actual-value scores for the respective predictions in the second subset to produce a total actual-value score for the second subset, wherein the total actual-value score for the second subset comprises the number of false-flag equiva-lents produced by the event prediction model; and (iii) after determining the number of catch equivalents and the number of false-flag equivalents produced by the event prediction model, causing a client station associated with a given user to present an indication of the number of catch equivalents and the number of false-flag equivalents produced by the event prediction model.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing methods.

In yet another aspect, disclosed herein is non-transitory computer-readable storage medium provisioned with program instructions that are executable to cause a computing system to carry out the functions disclosed herein, including but not limited to the functions of the foregoing methods.

One of ordinary skill in the art will appreciate these as well as numerous other aspects in reading the following disclosure.

BRIEF DESCRIPTION OF THE DRAWINGS

FIGS. 7A-D depict graphs that illustrate representative examples of how a sequence of predictions output by an event prediction model may compare to an example event window for an actual event occurrence.

FIGS. 8A-D depict graphs that illustrate how the example sequences of predictions shown in FIGS. 7A-D may potentially be grouped into alerts and then counted for catches and false flags.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
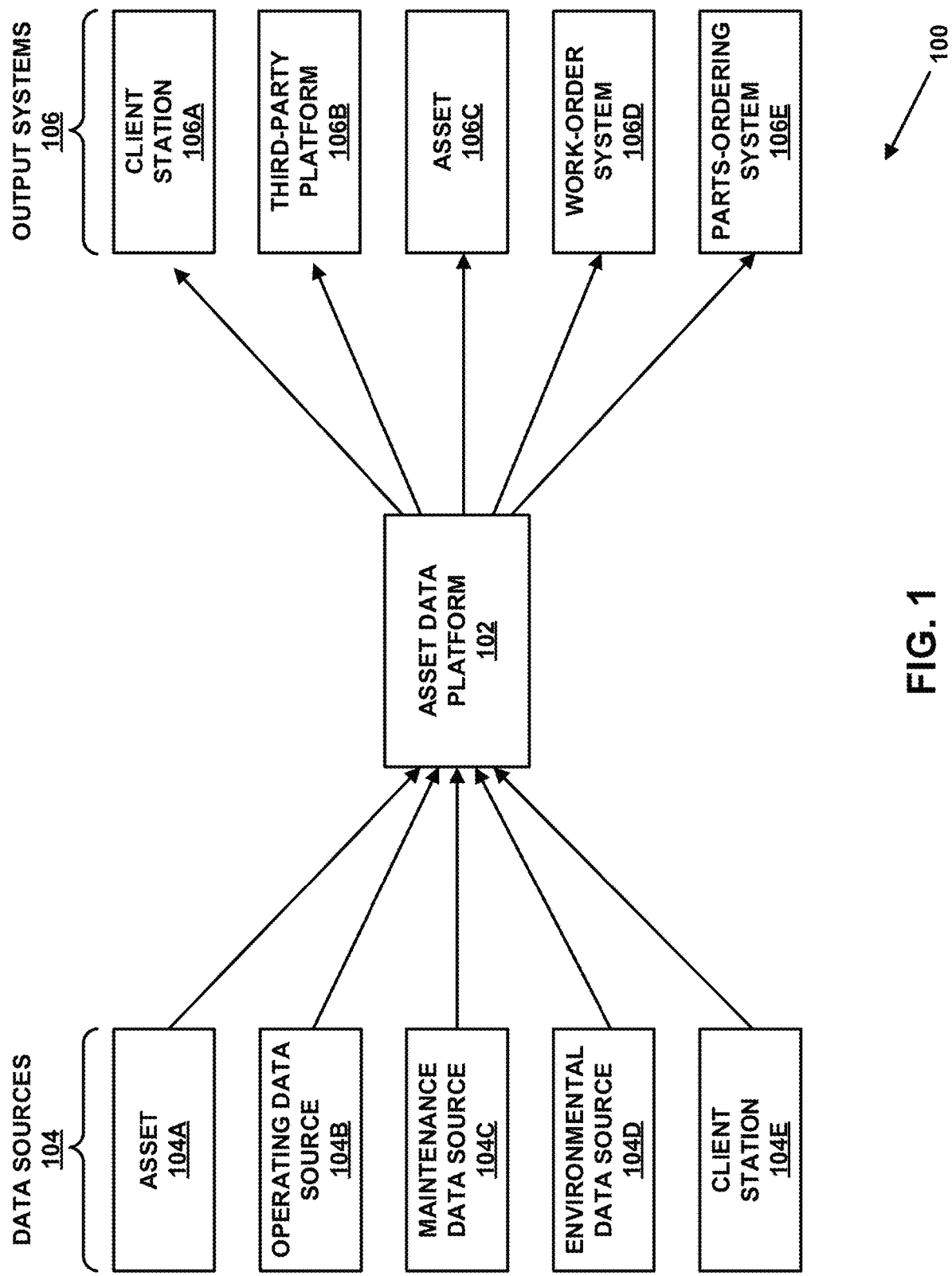
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Platform

Figure 2:
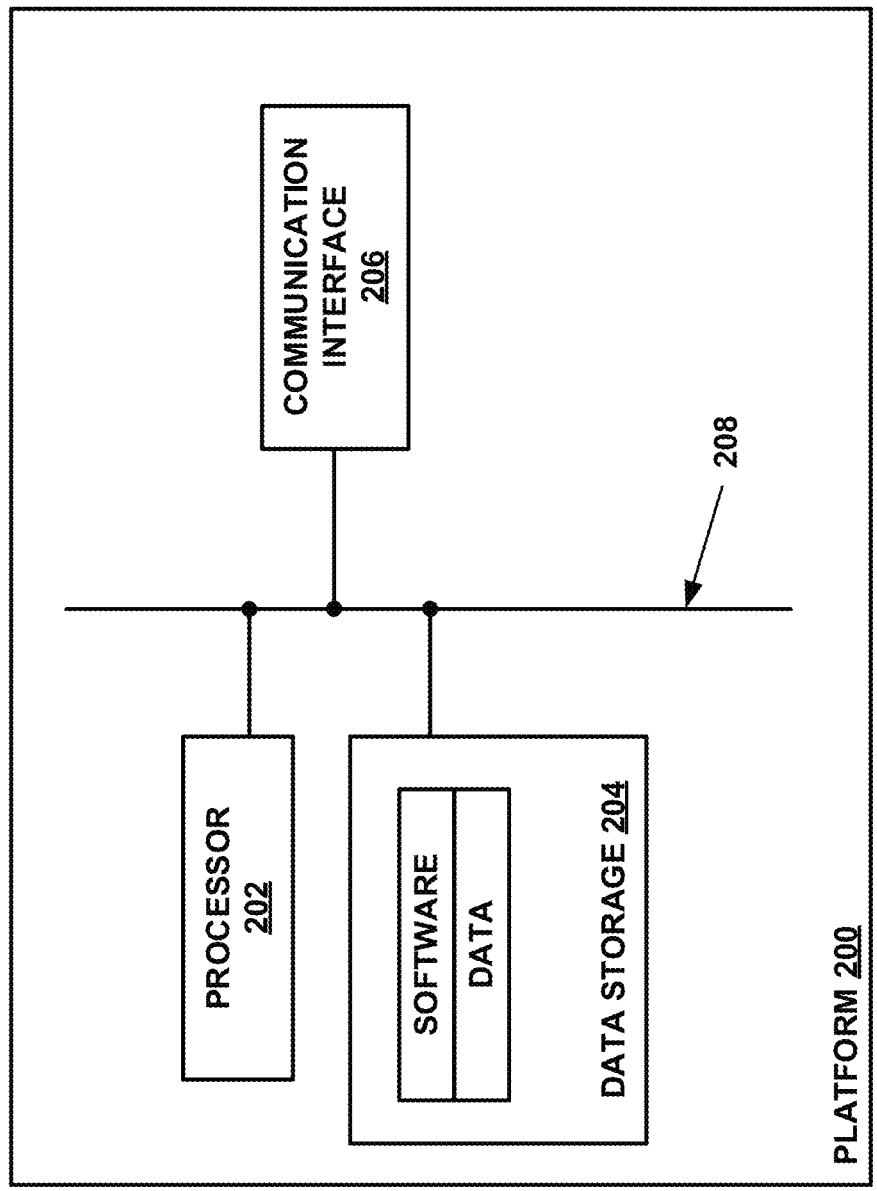
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
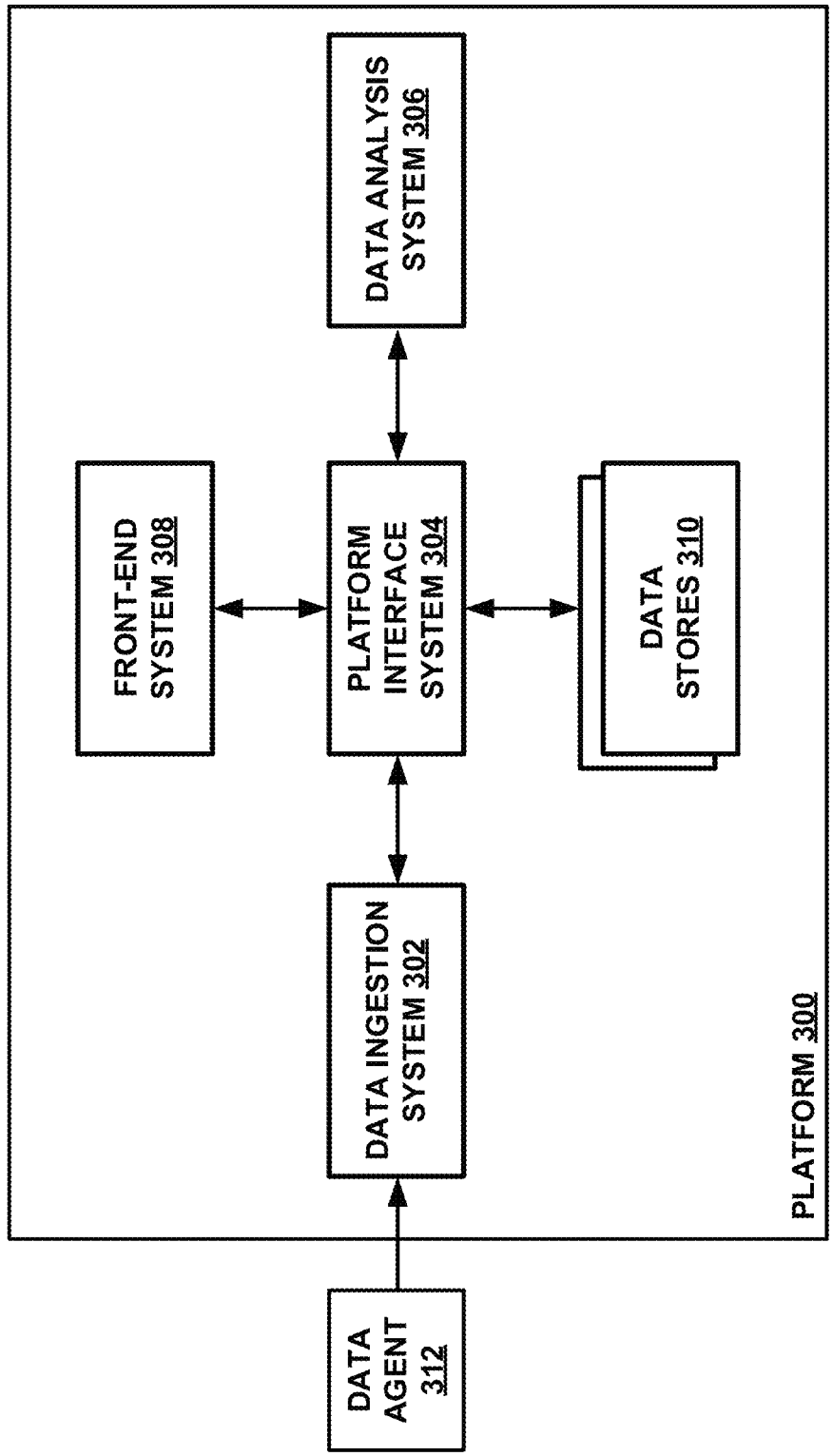
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application. Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application. Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application. Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application.

Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. Example Asset

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
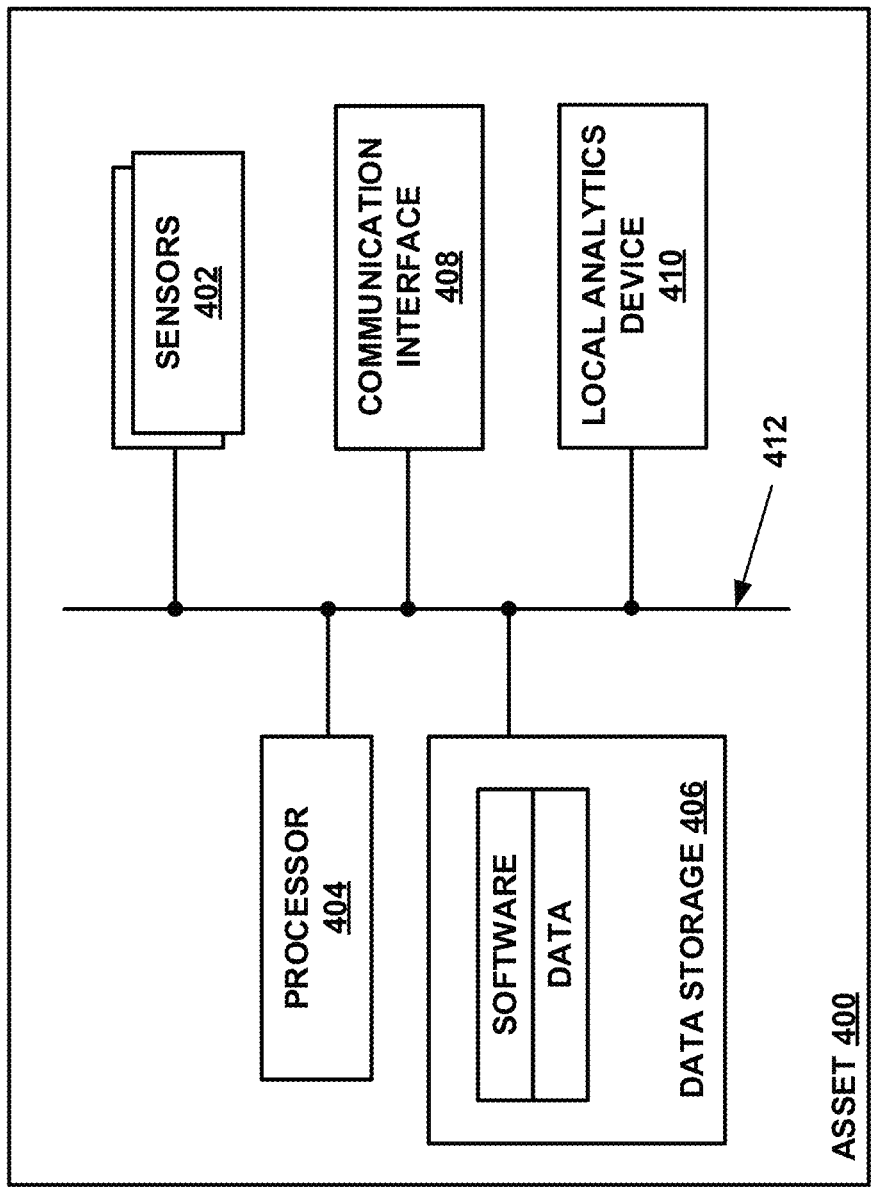
FIG. 4 depicts a simplified block diagram of the on-board components of an example asset.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primarily designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
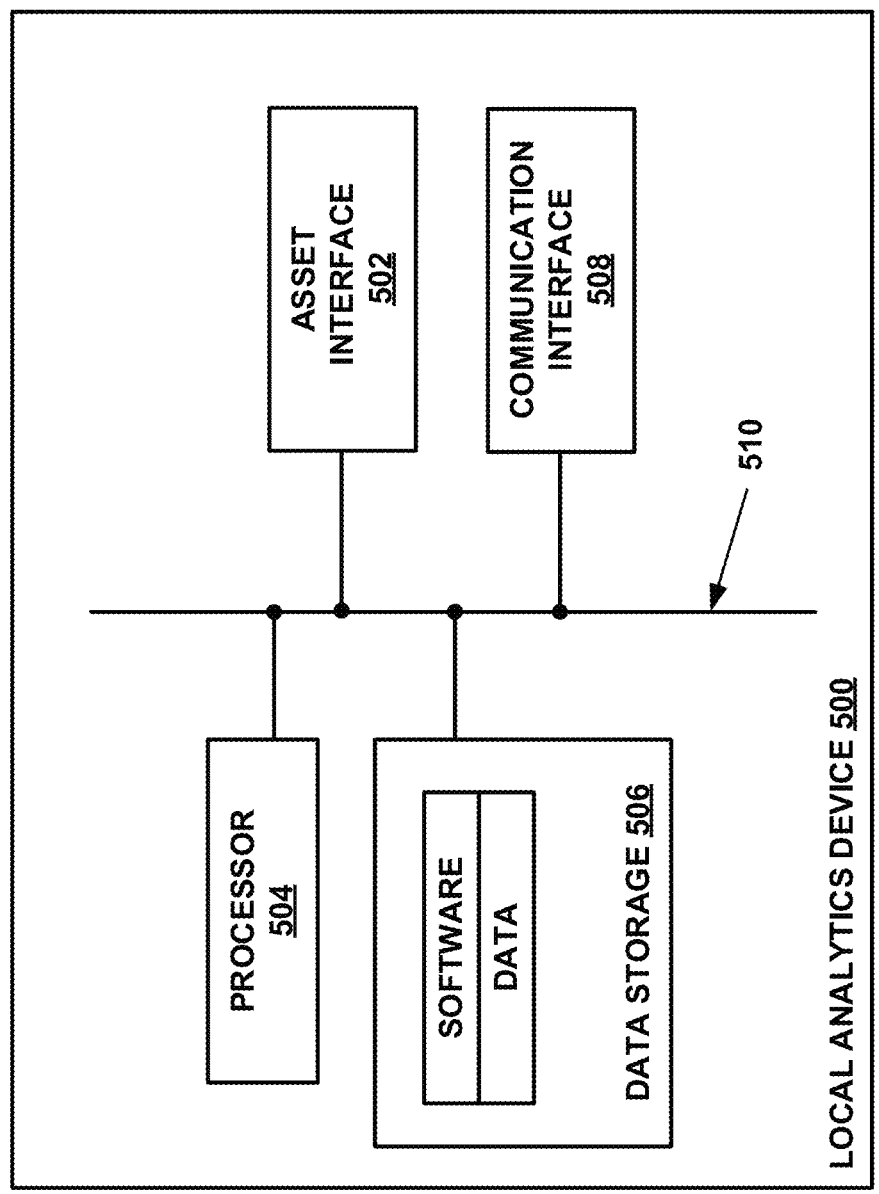
FIG. 5 depicts a simplified block diagram of an example local analytics device.

FIG. 5 illustrates a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset data platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, value, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely shows one example of the components of an asset, and that numerous other examples are also possible. For instance, the components of an asset may include additional components not pictured, may have more or less of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. Example Operations

As described above, disclosed herein is new technology for evaluating an "event prediction model," which generally refers to a predictive model that is configured to output a prediction of whether an event occurrence of a given type is forthcoming (e.g., whether an event is likely to occur within some period of time in the foreseeable future). Such an event occurrence model may take various forms.

For instance, the given type of event occurrence that is predicted by an event occurrence model may take any of various forms. As one example, the given type of event occurrence may be an occurrence of a failure on an asset, such as a failure of a particular type of asset component or a failure of a particular asset subsystem. As another example, the given type of event occurrence may be an occurrence of a particular type of change in an asset's operation, such as an asset shutdown. As yet another example, the given type of event occurrence may be an occurrence of a particular type of an external event that may impact an asset's operation, such as a particular weather event or a particular change in an environment where an asset is operating (referred to herein as an "operating environment"). The given type of event occurrence that is predicted by an event occurrence model may take various other forms as well—including the possibility that the given type of event occurrence is related to something other than the operation of an asset.

Further, the input data for an event prediction model may generally include any type of data that may be suggestive of whether or not an event occurrence of the given type is forthcoming. In this respect, depending on the given type of event occurrence that is predicted by an event occurrence model, the input data may take any of various forms. For instance, when the given type of event occurrence being predicted by an event occurrence model is an event related to the operation of a given asset under evaluation (e.g., an asset failure), the input data may include operating data for the given asset and/or other related assets (e.g., sensor data, abnormal-conditions data, and/or data derived therefrom), asset maintenance data for the given asset and/or other related assets, and/or environmental data for the given asset and/or other related assets, among other possibilities. The input data for an event prediction model may take various other forms as well—including the possibility that the input data is related to something other than the operation of an asset.

Further yet, an event prediction model's output may take any of various forms. In one implementation, an event prediction model may be configured such that each time it evaluates input data to render a prediction of whether an event occurrence of the given type is forthcoming, the event prediction model may output a metric reflecting a likelihood that an event occurrence is forthcoming, which may then be compared to an "event-occurrence threshold" to make a binary determination of whether the event occurrence is forthcoming. In such an implementation, the metric reflecting a likelihood that an event occurrence is forthcoming may take various forms. As one possible example, the metric reflecting a likelihood that an event occurrence is forthcoming may take the form of a probability metric reflecting a predicted probability of an event occurrence happening within some period of time in the future (e.g., within the next 2 weeks) that may be represented on a scale of either 0 to 100 or 0.0 to 1.0, and the event-occurrence threshold may then be represented on the same scale. However, the metric reflecting a likelihood that an event occurrence is forthcoming may take various other forms as well.

In another implementation, an event prediction model may be configured such that each time it evaluates input data to render a prediction of whether an event occurrence of the given type is forthcoming, the event prediction model outputs a binary indication of whether or not it predicts an event occurrence to be forthcoming, such as indicator that has a first value if the model predicts that an event occurrence is not likely to happen within some period of time in the future (e.g., a value of "0" or "No") and a second value if the model predicts that an event occurrence is likely to happen within some period of time in the future (e.g., a value of "1" or "Yes").

In yet another implementation, an event prediction model may be configured such that it only outputs an indicator when it predicts an event occurrence to be forthcoming, and otherwise does not output any data (i.e., it may output a null). In such an implementation, the indicator that is output by the event prediction model when it predicts an event occurrence to be forthcoming may take any of various forms, including but not limited to a simple indicator reflecting that a positive prediction has been rendered by the event prediction model (e.g., a "1" or "Yes") or a more detailed indicator identifying the given type of event occurrence that is predicted by the event prediction model (e.g., an event code).

An event prediction model's output may take other forms as well.

Still further, an event occurrence model may be defined in any of various manners. In one implementation, the process of defining an event occurrence model may generally involve (a) obtaining a set of training data for the event prediction model, which may comprise historical values for a set of data variables that are potentially suggestive of whether or not an event occurrence the given type is forthcoming, (b) analyzing the set of training data using a supervised and/or unsupervised machine learning technique in order to derive a relationship between (i) the values of at least a subset of the set of data variables and (ii) a likelihood that an event occurrence of the given type is forthcoming, and (c) embodying the derived relationship into a predictive model. In this respect, the supervised and/or unsupervised machine learning technique used to define the event prediction model may take any of various forms, examples of which may include regression, random forest, SVM, artificial neural networks, Naïve Bayes, decision trees, dimensionality reduction, kNN, gradient boosting, clustering, and association, among other possibilities. The process of defining an event occurrence model may take other forms as well.

An event prediction model may take various other forms as well. For instance, in one implementation, an event prediction model may take the form of a "combined" event prediction model that comprises a collection of multiple individual event prediction models and is configured to output a prediction of whether any one or more different types of event occurrences are forthcoming. One specific example of such a combined event prediction model is a health metric model that comprises a collection of individual asset failure models and is configured to output a prediction of whether any failure type from a group of failure types is likely to occur at an asset within the foreseeable future. This specific example of a combined event prediction model is described in further detail in U.S. application. Ser. No. 14/732,258, which is incorporated by reference herein in its entirety. Many other types of events prediction models exist as well.

Regardless of its exact form, a primary purpose of an event prediction model is to enable a data analytics platform to preemptively notify a user that an event occurrence of a given type is forthcoming sufficiently in advance of when the event occurrence actually happens, so that action can be taken to address the event occurrence before it actually happens. For instance, in the context of an event prediction model that is configured to predict whether an occurrence of an asset failure is forthcoming, the primary purpose is enable a data analytics platform (such as asset data platform 102) to preemptively notify a user that the occurrence of the asset failure is forthcoming sufficiently in advance of when the asset failure actually occurs, so that the asset can be taken out of circulation and/or maintenance can be performed before the failure actually occurs. In this way, an event prediction model may help to mitigate the costs that may otherwise result from an unexpected occurrence of an undesirable event like an asset failure—such as an increase in maintenance cost and/or a decrease in productivity—and may thus provide a positive net value to a user.

However, it should be understood that the value provided by an event prediction model depends in part on timing of the model's a preemptive prediction of an event occurrence relative to the actual time of the event occurrence. Indeed, an event prediction model that outputs a preemptive prediction of an event occurrence too far in advance of the actual time of the event occurrence may lead a user to prematurely take action that ends up being unnecessary, which has an associated cost that offsets the benefit provided the event prediction model. On the other hand, an event prediction model that outputs a preemptive notification of an event occurrence too close the actual time of the event occurrence may not give a user sufficient time to address the event occurrence, which limits the benefit provided the event prediction model.

In view of the foregoing, one way to evaluate an event prediction model is through the use of an "event window," which is a particular window of time preceding an actual event occurrence during which a preemptive prediction of an event occurrence of the given type is considered to provide a threshold level of net value (e.g., either a maximum net value or a net value greater than 0). In this respect, the beginning of an event window for an event occurrence of the given type may be set to the earliest time (relative to the actual time of the event occurrence) at which a preemptive notification of the event occurrence still provides the threshold level of net value, while the end of the event window for the event occurrence of the given type may be set to the latest time (relative to the actual time of the event occurrence) at which a preemptive notification of the event occurrence still provides the threshold level of net value.

Such an event window may take various forms, which may depend on factors such as the type of event occurrence, the cost associated with addressing an event occurrence of the given type, how the model's prediction accuracy is expected to change as predictions are rendered earlier in time, and the lead time needed to address an event occurrence of the given type, among other possibilities. As one representative example, an event window for an event occurrence of the given type may be set to (a) begin approximately 1-2 weeks before the actual time of the event occurrence and (b) end approximately 1-2 days before the actual time of the event occurrence. However, it should be understood that this representative example is merely provided for purposes of illustration, and that an event window for an event occurrence of the given type may begin and end at various other times relative to the event occurrence as well. Further, in some embodiments, it is possible that the beginning and end points of the event window may vary for different event occurrences of the same given type (e.g., based on external factors such as when the last event occurrence of the given type happened).

Once an event window for an event occurrence of the given type has been established, the event window can be used to classify each individual prediction output by the event prediction model into one of four categories: (1) a "true positive," which is an individual prediction that an event occurrence of the given type is forthcoming (i.e., a positive prediction) that falls within an event window preceding an actual event occurrence such that the prediction is deemed to be correct, (2) a "false positive," which is an individual prediction that an event occurrence of the given type is forthcoming (i.e., a positive prediction) that falls outside of any event window preceding an actual event occurrence such that the prediction is deemed to be incorrect, (3) a "true negative," which is an individual prediction that an event occurrence of the given type is not forthcoming (i.e., a negative prediction) that falls outside of any event window preceding an actual event occurrence such that the prediction is deemed to be correct, and (4) a "false negative," which is an individual prediction that an event occurrence of the given type is not forthcoming (i.e., a negative prediction) that falls within an event window preceding an actual event occurrence such that the prediction is deemed to be incorrect.

Once an event prediction model's outputs have been classified as described above, this classification may be used as a means for evaluating the event prediction model. For instance, the number of individual predictions output by the event prediction model that fall into each of the four categories may be placed into a "confusion matrix," which may provide a simple visualization of the event prediction model's performance. Such a confusion matrix is illustrated in Table 1:

TABLE 1

|  |  | Actual Outcome | |
|---|---|---|---|
|  |  | Event Actually Occurred | Event Did Not Actually Occur |
| Predicted Outcome | Event Predicted to Occur | $N_{TP}$ | $N_{FP}$ |
|  | Event Not Predicted to Occur | $N_{FN}$ | $N_{TN}$ |

In the confusion matrix illustrated in Table 1, "NTP" represents the number of individual "true positive" predictions output by the event prediction model, "NFP" represents the number of individual "false positive" predictions output by the event prediction model, "NFN" represents the number of individual "false negative predictions output by the event prediction model, and "NTN" represents the number of individual "true negative" predictions output by the event prediction model. This confusion matrix may thus provide an individual responsible for creating and/or deploying an event prediction model (e.g., a data scientist) with way to quickly assess the event prediction model's performance.

In addition, the number of individual predictions output by the event prediction model falling into each of these four categories may also be used to calculate metrics that characterize aspects of the event prediction model's performance. One such metric is "precision," which may be calculated using the following equation:

$$\text{Precision} = \frac{N_{TP}}{(N_{TP} + N_{FP})} \quad (1)$$

Thus, as shown, "precision" comprises a ratio between the number of individual "true positive" predictions output by an event predictive model (i.e., predictions that an event occurrence is forthcoming falling within an event window) and the total number of individual "positive" predictions output by an event predictive model, which indicates which percentage of "positive" predictions output by the event prediction model actually turned out to be correct.

Another such metric is "recall" (also referred to as "sensitivity" or "recognition rate"), which may be calculated using the following equation:

$$\text{Recall} = \frac{N_{TP}}{(N_{TP} + N_{FN})} \quad (2)$$

Thus, as shown, "recall" comprises a ratio between the number of individual "true positive" predictions output by an event predictive model (i.e., predictions that an event occurrence is forthcoming falling within an event window) and the total number of predictions that fell within an event window, which indicates what percentage of the event prediction model's outputs that should have been "positive" predictions actually were "positive" predictions.

However, because each of these metrics only provides insight into one specific aspect of an event prediction model's performance, neither of these metrics standing alone can be used to provide a reliable comparison between different event prediction models. Indeed, an event prediction model that only outputs positive predictions when it is extremely confident may provide perfect "precision," but may output too many false negatives to be considered useful. On the other hand, an event prediction model that always outputs positive predictions may provide perfect "recall," but the model's outputs would have no meaning at all.

As such, existing approaches for evaluating event prediction models typically attempt to combine precision and recall into a single metric that is intended to represent the performance of an event prediction model. One such combined metric may take the form of an F-beta score, which constitutes a weighted harmonic average of precision and recall, where one of these metrics (typically recall) is weighted more heavily than the other. However, even if a set of different event prediction models are each assigned a respective F-beta score, attempting to use the different event prediction models' respective F-beta scores to determine which of the different event models is "better" tends to lead to inconsistent and suboptimal results. There are a few reasons for this.

First, given that precision and recall characterize different aspects of an event prediction model's performance that are not necessarily represented on the same scale, it is difficult to properly weight (or "tune") these metrics when combining them into a single metric like F-beta score. As a result, the F-beta scores that are assigned to different models tend to be difficult to interpret, and generally do not serve as a reliable basis for determining which of several different event prediction models is "better."

Second, metrics such as precision, recall, and F-beta do not sufficiently reflect the business value provided by an event prediction model, in terms of the net benefit achieved as a result of a correct, preemptive prediction of an event occurrence or the net cost incurred as a result of an incorrect, preemptive prediction of an event occurrence. For this additional reason, metrics such a precision, recall, and F-beta generally do not serve as a reliable basis for determining which of several different event prediction models is "better."

Due to these and other problems with existing technology for evaluating and comparing the performance of event prediction models, there is a need for technology that enables a data analytics platform to carry out a more reliable comparison of event prediction models that sufficiently accounts for the business value provided by the event prediction models. In view of this need, disclosed herein is a new approach for comparing different event prediction models that are configured to preemptively predict event occurrences of the same given type, which may be carried out by a data analytics platform such as asset data platform 102.

In practice, the event prediction models that are compared using the disclosed approach may differ in various manners. As one possibility, the different event prediction models may comprise event prediction models configured to preemptively predict event occurrences of the same given type that were created using different hyperparameters. As another possibility, the different event prediction models may comprise event prediction models configured to preemptively predict event occurrences of the same given type that were created using different machine learning techniques. As yet another possibility, the different event prediction models may comprise event prediction models configured to preemptively predict event occurrences of the same given type that were created using different sets of training data. As still another possibility, the different event prediction models may comprise event prediction models configured to preemptively predict event occurrences of the same given type that make use of different event-occurrence thresholds. The event prediction models that are compared using the disclosed approach may differ in various other manners as well.

Further, in line with the discussion above, the given type of event occurrences predicted by the different event prediction models, the inputs of the different event prediction models, the outputs of the different event prediction models, and the manner in which the different event prediction models are created may take any of various forms.

Figure 6:
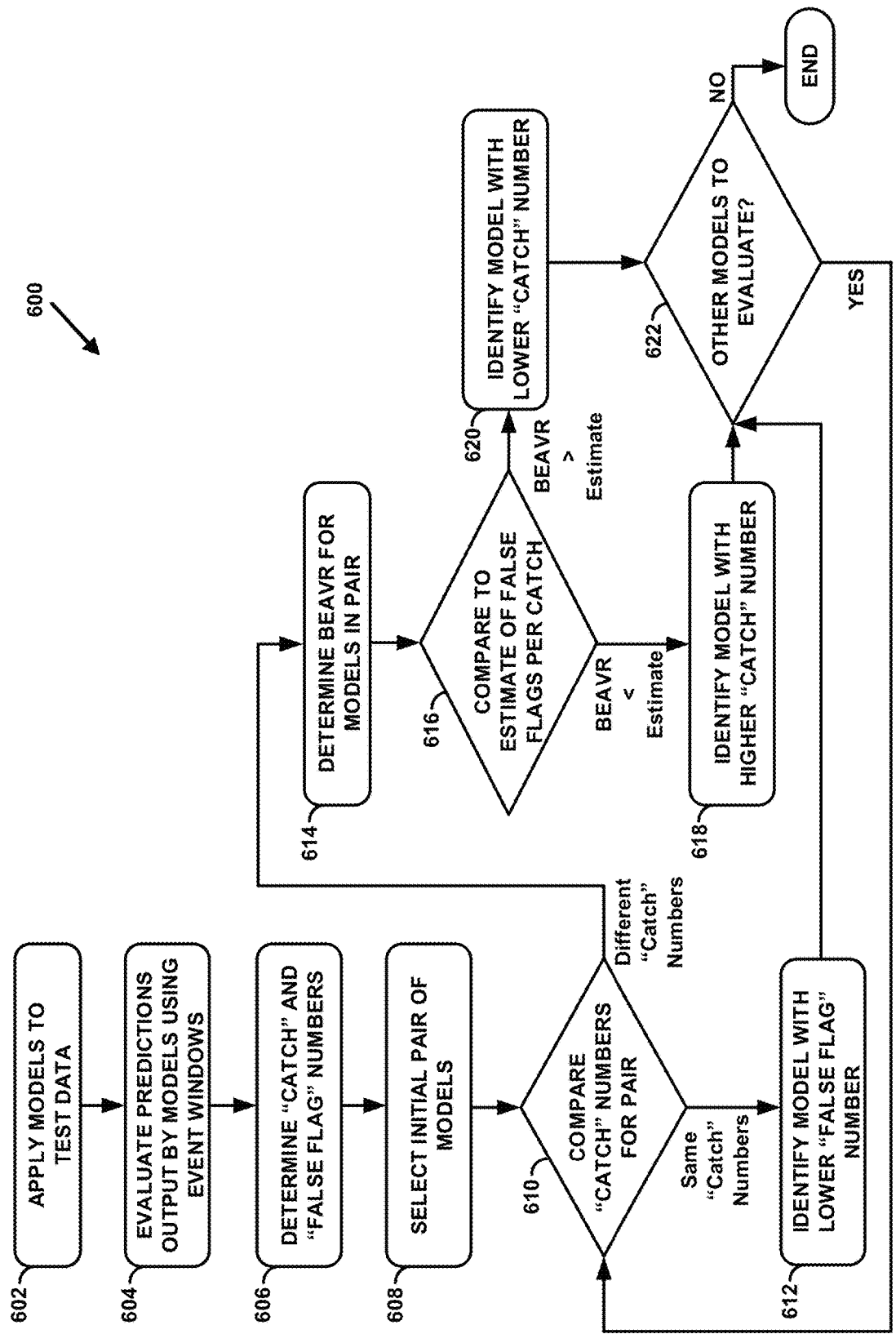
FIG. 6. is a flow diagram showing some example operations that may be included in a process for comparing different event prediction models that are configured to preemptively predict event occurrences of the same given type, according to an example embodiment.

Referring now to FIG. 6, a functional block diagram 600 is provided that illustrates one example embodiment of the disclosed process for comparing different event prediction models that are configured to preemptively predict event occurrences of the same given type. For the purposes of illustration, the example operations are described as being carried out by asset data platform 102, but it should be understood that data analytics platforms other than asset data platform 102 may perform the example operations. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 6, the disclosed process may begin at block 602 with asset data platform 102 applying each of the different event prediction models to a given set of test data that comprises historical time-series values for a set of input variables from a period of time during which there are known instances of actual event occurrences of the given type, which may result in each of the different event prediction models outputting a respective set of predictions of whether an event occurrence of the given type is forthcoming. In this respect, the respective set of predictions output by each of the different event prediction models will preferably be classified as either positive predictions (i.e., a prediction that an event occurrence is forthcoming) or negative predictions (i.e., a prediction that an event occurrence is not forthcoming), which may involve a comparison between the event prediction models' outputs and an event-occurrence threshold.

At block 604, asset data platform 102 may evaluate the set of predictions output by each of the different event prediction models using event windows for the known instances of actual event occurrences that correspond to the given set of test data. In this respect, consistent with the discussion above, the respective event window for each known instance of an event occurrence may generally comprise a window of time that (1) begins at the earliest point in time relative to the actual time of the event occurrence at which a preemptive prediction of the event occurrence is still expected to provide the threshold level of net value (e.g., a preemptive prediction is still close enough in time to the actual event occurrence to provide a net benefit that sufficiently outweighs the net cost of taking unnecessary action) and (2) ends at the latest point in time relative to the actual time of the event occurrence at which a preemptive notification of the event occurrence is still expected to provide the threshold level of net value (e.g., a preemptive prediction of the event occurrence still leaves enough time to take remedial action).

In practice, the length of time in advance of each known instance of an actual event occurrence that a respective event window is to begin and end may be defined in various manners. As one possibility, asset data platform 102 may define the length of time in advance of each known instance of an event occurrence that a respective event window is to begin and end based on user input that is entered via a client station, such as client station 104E (e.g., a relative start time and a relative end time to be used for each event window). As another possibility, asset data platform 102 may define the length of time in advance of each known instance of an event occurrence that a respective event window is to begin and end based on an analysis of historical data indicating the net value of outputting a preemptive prediction of an event occurrence of the given type at each of various different times in advance of the actual time of the event occurrence. As yet another possibility, asset data platform 102 may define the length of time in advance of each known instance of an event occurrence that a respective event window is to begin and end based on an analysis of the actual time of one or more preceding event occurrences. The length of time in advance of each known instance of an actual event occurrence that a respective event window is to begin and end may be defined in other manners as well.

Some representative examples of how a sequence of predictions output by an event prediction model may compare to an example event window for an actual event occurrence are illustrated in FIGS. 7A-D. As shown, each of FIGS. 7A-D comprises a graph having (1) an x-axis 702 that indicates the time of the model's output relative to the actual event occurrence, where $T_e$ is the actual time of the event occurrence, $T_{e-1}$ is one time unit prior to the actual time of the event occurrence, $T_{e-2}$ is two time units prior to the actual time of the event occurrence, and so on, and (2) a y-axis 704 that indicates whether the model's output was a prediction that an event occurrence of the given type is forthcoming (i.e., a "Yes" prediction) or a prediction that an event occurrence of the given type is not forthcoming (i.e., a "No" prediction). Further, each of FIGS. 7A-D shows how a different example sequence of predictions output by an event prediction model may compare to an example event window that begins shortly before $T_{e-4}$ and ends shortly after $T_{e-1}$.

For instance, FIG. 7A illustrates an example graph 710 where an event prediction model outputs "No" predictions at each time prior to the beginning of the example event window for the actual event occurrence and then outputs "Yes" predictions at each time within the example event window. In this respect, the example sequence of predictions of FIG. 7A may be classified as 11 true negatives and 4 true positives.

Further, FIG. 7B illustrates an example graph 720 where an event prediction model outputs "No" predictions up until $T_{e-11}$ and then begins outputting "Yes" predictions from $T_{e-10}$ until the end of the example event window. In this respect, the example sequence of predictions of FIG. 7B may be classified as 5 true negatives, 6 false positives (because the positive predictions between $T_{e-10}$ and $T_{e-5}$ fall outside of the example event window), and 4 true positives.

Figure 7C:
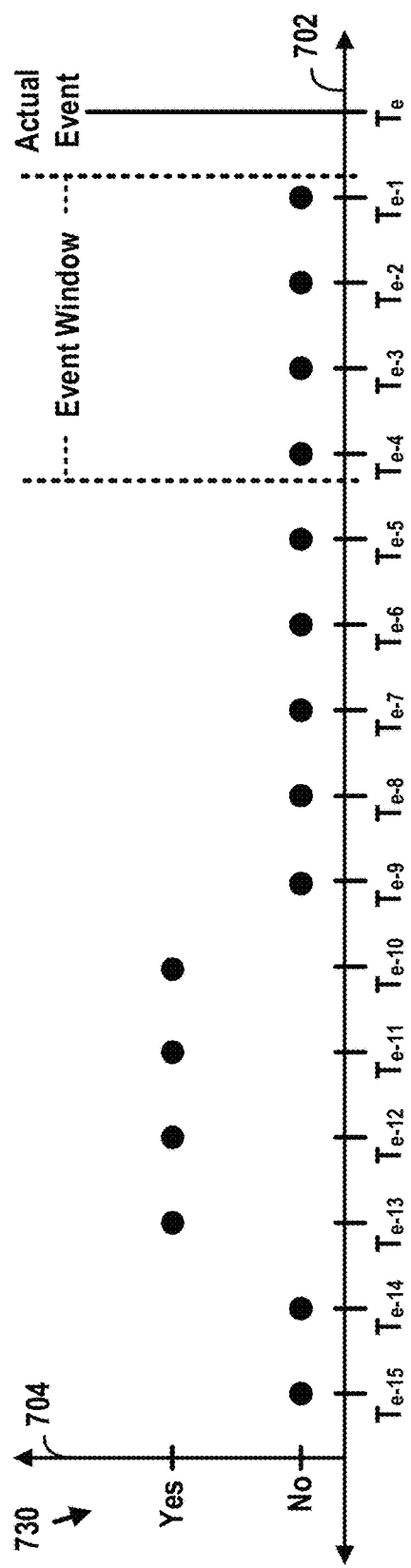

Further yet, FIG. 7C illustrates an example graph 730 where an event prediction model outputs "No" predictions up until $T_{e-14}$, begins outputting "Yes" predictions between $T_{e-13}$ and $T_{e-10}$, and then changes back to outputting "No" predictions from $T_{e-9}$ until the end of the example event window. In this respect, the example sequence of predictions of FIG. 7C may be classified as 7 true negatives, 4 false positives (because the positive predictions between $T_{e-13}$ and $T_{e-10}$ fall outside of the example event window), and 4 false negatives (because the negative predictions between $T_{e-4}$ and $T_{e-1}$ fall within the example event window).

Figure 7D:
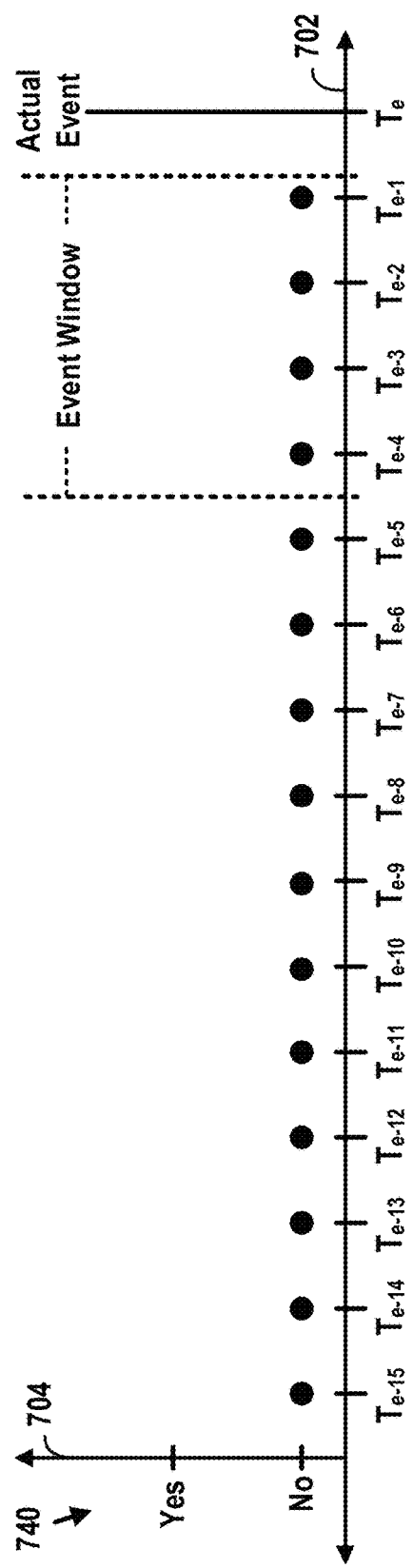

Still further, FIG. 7D illustrates an example graph 740 where an event prediction model outputs "No" predictions at each time preceding the actual time of the event occurrence. In this respect, the example sequence of predictions of FIG. 7D may be classified as 11 true negatives and 4 false negatives (because the negative predictions between $T_{e-4}$ and $T_{e-1}$ fall within the example event window).

Numerous other examples of how a sequence of predictions output by an event prediction model may compare to an event window for an actual event occurrence exist as well.

Referring now to block 606 of FIG. 6, while asset data platform 102 is evaluating the set of predictions output by each of the different event prediction models using event windows for the known instances of actual event occurrences, asset data platform 102 may determine a respective number of "catches" and a respective number of "false flags" produced by each of the different event prediction models, where a "catch" is generally defined as a correct prediction that an event occurrence is forthcoming and a "false flag" is generally defined as an incorrect prediction that an event occurrence is forthcoming. In this respect, the manner in which the number of "catches" and the number of "false flags" produced by an event prediction model are counted may take various forms.

As one implementation, catches and false flags may be counted on an individual prediction-by-prediction basis, such that each individual "true positive" prediction is counted as a separate catch and each individual "false positive" prediction is counted as a separate false flag. Thus, if asset data platform 102 is configured to count catches and flags in accordance with this implementation, then (1) the example sequence of predictions of FIG. 7A comprises 4 catches and 0 false flags, (2) the example sequence of predictions of FIG. 7B comprises 4 catches and 6 false flags, (3) the example sequence of predictions of FIG. 7C comprises 0 catches and 4 false flags, and (4) the example sequence of predictions of FIG. 7C comprises 0 catches and 0 false flags.

As another implementation, the individual positive predictions output by an event prediction model may first be grouped into "alerts," where an "alert" is defined as a sequence of one or more individual positive predictions that are collectively treated as a single positive prediction "unit" for purposes of evaluating the performance of the event prediction model, and catches and false flags may then be counted on an alert-by-alert basis. In this respect, the criteria that is used to group individual positive predictions into alerts may take various forms. As a preferred example, the criteria may dictate that a new alert begins when the model changes from outputting a negative prediction to outputting a positive prediction and ends when the model changes from outputting a prediction back to outputting a negative prediction. Under this criteria, (1) any sequence of two or more consecutive positive predictions may be grouped into a single "alert," (2) a sequence of two or more positive predictions that includes an intervening negative prediction may be considered two separate "alerts," and (3) any standalone positive prediction that is not preceded or followed by another positive prediction may be considered its own separate "alert." However, the criteria that is used to group individual positive predictions into alerts may take other forms as well—including the possibility that a given sequence of two or more positive predictions that has one or more intervening negative predictions may still be grouped into a single "alert" in some circumstances (e.g., when the extent of intervening negative predictions in the sequence is low).

Once the individual positive predictions output by an event prediction model are grouped into alerts, the alerts may then be evaluated to determine whether each alert is to be counted as a catch or a false flag. In this respect, an alert may be counted as a catch when at least one positive prediction included in alert falls within an event widow preceding an actual event occurrence, whereas an alert may be counted as a false flag when every positive prediction included in alert falls outside of any event window preceding an actual event occurrence.

An illustration of how the example sequences of predictions shown in FIGS. 7A-D may potentially be grouped into alerts and then counted for catches and false flags is provided by FIGS. 8A-D, each of which comprises a graph having an x-axis 802 that indicates the time of the model's output relative to the actual event occurrence and a y-axis 804 that indicates whether the model's output was a "Yes" prediction or a "No" prediction.

For instance, FIG. 8A illustrates how the example sequence of predictions of FIG. 7A may be grouped into alerts and then counted for catches and false flags. As shown, this may involve grouping the sequence of consecutive predictions between $T_{e-4}$ and $T_{e-1}$ into a single alert, which may in turn lead to a determination that the example sequence of predictions of FIG. 7A comprises 1 catch and 0 false flags.

Further, FIG. 8B illustrates how the example sequence of predictions of FIG. 7B may be grouped into alerts and then counted for catches and false flags. As shown, this may involve grouping the sequence of consecutive predictions between $T_{e-8}$ and $T_{e-1}$ into a single alert, which may in turn lead to a determination that the example sequence of predictions of FIG. 7B also comprises 1 catch and 0 false flags.

Further yet, FIG. 8C illustrates how the example sequence of predictions of FIG. 7C may be grouped into alerts and then counted for catches and false flags. As shown, this may involve grouping the sequence of consecutive predictions between $T_{e-13}$ and $T_{e-10}$ into a single alert, which may in turn lead to a determination that the example sequence of predictions of FIG. 7C comprises 0 catches and 1 false flag.

Still further, FIG. 8D illustrates how the example sequence of predictions of FIG. 7D may be grouped into alerts and then counted for catches and false flags. As shown, this may involve an identification of no alerts (because there are no positive predictions), which may in turn lead to a determination that the example sequence of predictions of FIG. 7D comprises 0 catches and 0 false flags.

Numerous other examples of how a sequence of predictions output by an event prediction model may be grouped into alerts and then counted for catches and false flags may exist as well.

The respective number of catches and the respective number of false flags produced by each of the different event prediction models may be determined in various other manners as well, including through the use of the new approach for determining catch equivalents and false flag equivalents that is disclosed herein and discussed in further detail below.

After asset data platform 102 determines the respective number of catches and the respective number of false flags produced by each of the different event prediction models, asset data platform 102 may use this information to perform a relative comparison of the different event prediction models and thereby determine which of the different event prediction models provides the highest net value. Asset data platform 102 may carry out this comparison in various manners.

According to one implementation, at block 608, asset data platform 102 may select an initial pair of the different event prediction models. In this respect, if asset data platform 102 is evaluating only two different event prediction models, then the initial pair may comprise the entire set of event prediction models under evaluation, and the process of comparing the different event prediction models may involve only a single comparison between the two different event prediction models. On the other hand, if asset data platform 102 is evaluating more than two different event prediction models, then the initial pair may comprise a subset of the event prediction models under evaluation, and the process of comparing the different event prediction models may involve an iterative sequence of comparisons between different pairs of event prediction models.

At block 610, asset data platform 102 may compare the respective "catch" numbers produced by the two event prediction models in the pair, which may lead asset data platform 102 to reach one of two determinations: (1) that the respective catch numbers produced by the two event prediction models in the pair are the same or (2) that the respective catch numbers produced by the two event prediction models in the pair are different. Asset data platform 102 may then proceed in one of two different manners depending on which one of these determinations is reached.

For instance, if asset data platform 102 determines at block 610 that the respective catch numbers produced by the two event prediction models in the pair are the same, then as shown at block 612, asset data platform 102 may identify whichever one of the event prediction models in the pair produced a lower number of false flags as the event prediction model in the pair that provides a higher net value and may then eliminate the other one of the event prediction models in the pair from consideration.

On the other hand, if asset data platform 102 determines at block 610 that the respective catch numbers produced by the two event prediction models in the pair are different such that a first one of the event prediction models in the pair produced a higher number of catches than a second one of the event prediction models in the pair, then as shown at block 614, asset data platform 102 may determine an indication of how many additional false flags are produced by the first one of the event prediction models relative to the second one of the event prediction models in order for the first one of the event prediction models to produce each additional catch, which may be referred to as the "Break-Even Alert Value Ratio" of the two event prediction models (or "BEAVR" for short). In practice, asset data platform 102 may determine the BEAVR for the two event prediction models in the pair by (a) calculating a first difference between the respective number of false flags produced by the first one of the event prediction models in the pair and the respective number of false flags produced by the second one of the event prediction models in the pair, (b) calculating a second difference between the respective number of catches produced by the first one of the event prediction models in the pair and the respective number of catches produced by the second one of the event prediction models in the pair, and then (c) dividing the first difference by the second difference. This operation may be represented via the following equation:

$$BEAVR_{1,2} = \frac{(NFF_1 - NFF_2)}{(NC_1 - NC_2)}, \quad (3)$$

where "$NFF_1$" may represent the number of false flags produced by the first one of the event prediction models in the pair, "$NFF_2$" may represent the number of false flags produced by the second one of the event prediction models in the pair, "$NC_1$" may represent the number of catches produced by the first one of the event prediction models in the pair, and "$NC_2$" may represent the number of catches produced by the second one of the event prediction models in the pair.

To illustrate with a specific example, consider a scenario where a first event prediction model produces 9 catches and 32 false flags and a second event prediction model produces 7 catches and 24 false flags. Using the disclosed approach, the BEAVR between these two event prediction models may be determined as follows:

$$BEAVR_{1,2} = \frac{(32 - 24)}{(9 - 7)} = \frac{8}{2} = 4$$

Thus, the BEAVR in this example indicates that 4 additional false flags are produced by the first event prediction model relative to the second event prediction model in order for the first event prediction model to produce each additional catch. It should be understood that this specific example is merely provided for purposes of illustration, and that numerous other examples are possible as well.

Notably, unlike existing metrics such as precision, recall, and F-beta, the new BEAVR metric that is determined and used as part of the disclosed process provides a measure of one event predictions model's performance relative to another event prediction model.

Once the BEAVR is determined between the two event prediction models in the pair, then at block 616, asset data platform 102 may compare the BEAVR to an estimate of how many false flags are worth trading for one catch, which is one way to represent the ratio between the estimated net benefit of a catch and the estimated net cost of a false flag for an event occurrence of the given type. For instance, if the net benefit of a catch is estimated to be some multiplier greater than the net cost of a false flag (e.g. 5 times greater) for an event occurrence of the given type, then the estimate of how many false flags are worth trading for one catch may be set to that given multiplier. In this respect, basing the comparison between event prediction models on an estimate of how many false flags are worth trading for one catch advantageously provides a way to incorporate the net value provided by the event prediction models into the evaluation while at the same time avoiding the need to provide separate estimates of the net benefit of a catch and the net cost of a false flag, which typically requires information that may be unavailable to an individual responsible for creating and/or deploying an event prediction model. With that said, if there is information available regarding the net benefit of a catch and the net cost of a false flag for an event occurrence of the given type, then this information can certainly be used to establish the estimate of how many false flags are worth trading for one catch.

Based on the comparison performed at block 616, asset data platform 102 may reach one of two determinations: (1) that the BEAVR determined for the two event prediction models in the pair is less than the estimate of how many false flags are worth trading for one catch or (2) that the BEAVR determined for the two event prediction models in the pair is greater than (or equal to) the estimate of how many false flags are worth trading for one catch. Asset data platform 102 may then proceed in one of two different manners depending on which one of these determinations is reached.

For instance, if asset data platform 102 determines at block 616 that the BEAVR determined for the two event prediction models in the pair is less than the estimate of how many false flags are worth trading for one catch, then as shown at block 618, asset data platform 102 may identify the first one of the event prediction models (i.e., the model that produced the higher number of catches) as the event prediction model in the pair that provides a higher net value and eliminate the second one of the event prediction models (i.e., the model that produced the lower number of catches) from consideration.

On the other hand, if asset data platform 102 determines at block 616 that the BEAVR determined for the two event prediction models in the pair is greater than or equal to the estimate of how many false flags are worth trading for one catch, then as shown at block 620, asset data platform 102 may identify the second one of the event prediction models (i.e., the model that produced the lower number of catches) as the event prediction model in the pair that provides a higher net value and eliminate the first one of the event prediction models (i.e., the model that produced the higher number of catches) from consideration.

As will be appreciated, the evaluation performed at blocks 614-620 embodies the principle that when comparing two event prediction models that have produced different numbers of catches, a first event prediction model that produces an increased number of catches relative to a second event prediction model may be considered to provide a higher net value only if the number of additional false flags produced by the first event prediction model per each additional catch is lower than the estimate of how many false flags are worth trading for one catch (which serves as a way to represent the ratio between the estimated net benefit of a catch and the estimated net cost of a false flag). Otherwise, the net benefit resulting from the increased number of catches produced by the first event prediction model is outweighed by the net cost resulting from the additional false flags produced by the first event prediction model in order to achieve the increased number of catches, which amounts to an overall decrease in net value provided by the first event prediction model despite the fact that it produces an increased number of catches.

After identifying which of the two event prediction models in the initial pair provides a higher net value, then at block 622, asset data platform 102 may determine whether there are any other event prediction models to evaluate. In this respect, if there is no other event prediction model to evaluate, asset data platform 102 may determine that the identified event prediction model from the initial pair provides the highest net value of the different event prediction models under consideration, and the comparison process of FIG. 6 may conclude.

On the other hand, if there is at least one other event prediction model to evaluate, asset data platform 102 may then repeat the functions set forth at blocks 610-620 for a new pair of event prediction models that includes the identified event prediction model from the initial pair and another event prediction model that is yet to be evaluated, which may result in asset data platform 102 identifying which of these two event prediction models has a higher net value. Asset data platform 102 may then continue in this manner until there is no event prediction model left to be evaluated, at which point asset data platform 102 may determine that the event prediction model identified as providing a higher net value in the final pair is also the model that provides the highest net value of the different event prediction models under consideration.

After using the comparison process of FIG. 6 to determine which of the different event prediction models provides the highest net value—which may be referred to herein as the "selected event prediction model"—asset data platform 102 may then take one or more actions based on this determination. These actions may take various forms.

As one possibility, after determining which of the different event prediction models provides the highest net value, asset data platform 102 may responsively deploy the selected event prediction model and thereafter begin applying that selected event prediction model to observation data received from one or more data sources 104.

As another possibility, asset data platform 102 may use the disclosed process again to compare the selected event prediction model to the existing mechanism being used to monitor for forthcoming event occurrences of the given type, which could take the form of an existing event prediction model (if that existing model was not included in the set of event prediction models that were subject to the previous comparison), periodic evaluation by a user (e.g., a subject matter expert or the like), or no mechanism at all (in which case the number of catches and number of false flags would both be 0). In this respect, if the comparison between the selected event prediction model and the existing mechanism yields a determination that the selected event prediction model provides a higher net value than the existing mechanism, asset data platform 102 may responsively deploy the selected event prediction model and thereafter begin using the selected event prediction model (rather than the existing mechanism) to evaluate whether event occurrences are forthcoming.

As yet another possibility, after determining which of the different event prediction models provides the highest net value, asset data platform 102 may cause an indication of this determination to be presented to a user, such as an individual responsible for creating and/or deploying an event prediction model that is configured to preemptively predict event occurrences of the given type (e.g., a data scientist) or a representative of an organization that is considering whether to begin using an event prediction model to monitor for forthcoming event occurrences related to the organization's business (e.g., a customer of a platform provider such as an asset owner).

In this respect, the function of causing an indication of the determination as to which of the different event prediction models provides the highest net value to be presented to a user may take various forms. As one possibility, asset data platform 102 may instruct a client station (e.g., client station 106A) associated with a given user to present an indication of the platform's determination as to which of the different event prediction models provides the highest net value. For example, asset data platform 102 may provide such an instruction to a client station automatically upon reaching the determination as to which of the different event prediction models provides the highest net value, or may provide such an instruction to a client station in response to receiving a request from the client station, among other possibilities.

Further, the indication presented to the user may take any of various forms. As examples, the indication may take the form of an alert notification (e.g., a pop-up window, email, text message, or the like) and/or an indicator that appears within a graphical user interface (GUI) screen displayed by the client station, among other possibilities.

Further yet, the indication presented to the user may comprise various information. As one example, this indication presented to the user may comprise an identification of the selected event prediction model. As another example, indication presented to the user may comprise information about the performance of the selected event prediction model, such as a number of catches and/or false flags produced by the selected event prediction model, a ratio between the number of false flags and the number of catches produced by the selected event prediction model, and/or a BEAVR between the selected event prediction model and one or more of the other event prediction models that were evaluated (e.g., the next closest model), among other possibilities. As yet another example, the indication presented to the user may comprise information about the performance of one or more other event prediction models that were evaluated and determined to provide lower net values, such as a number of catches and/or false flags produced by other event prediction models and/or a ratio between the number of false flags and the number of catches produced by other event prediction models, among other possibilities. The indication presented to the user may comprise other information as well.

Once asset data platform 102 has caused an indication of the platform's determination as to which event prediction model provides the highest net value to be presented to a user, this indication may prompt the user to take various follow-up actions. As one example, the indication may prompt the user to take additional steps to cause the selected event prediction model to be deployed by asset data platform 102 (and/or some other data analytics platform). As another example, the indication may prompt the user to promote the selected event prediction model to a subsequent phase of the evaluation process, which may involve further testing of the selected event prediction model and/or further comparison with other event prediction models. As yet another example, the indication may prompt the user to create and evaluate new event prediction models that are configured to preemptively predict event occurrences of the given type. The indication of the platform's determination as to which event prediction model provides the highest net value may prompt a user to take various other follow-up actions as well.

As still another possibility, after performing the comparison and determining which of the different event prediction models provides the highest net value, asset data platform 102 may store an indication of the determination for future reference. For example, asset data platform 102 may be configured to repeat the comparison of the different event prediction models multiple different times (e.g., based on different sets of test data) and then evaluate the results from the multiple different comparisons in order to determine which of the different event prediction models (if any) to deploy. In this respect, the evaluation of the results from the different comparisons may involve determining which of the different event prediction models was most often identified as providing the highest net value. As another example, asset data platform 102 may be configured to present historical results from the model comparisons it has performed to a user for various purposes (e.g., to demonstrate how some kinds of event prediction models perform relative to other kinds of models). As yet another example, asset data platform 102 may be configured to evaluate the performance of a given event prediction model that is currently being deploying with historical results from a prior comparison of a set of event prediction models that included the given event prediction model.

Asset data platform 102 may use the determination of which event prediction model has the highest net value as a basis for taking other actions as well.

While FIG. 6 depicts one example embodiment of the disclosed process for comparing different event prediction models that are configured to preemptively predict event occurrences of the same given type, it should be understood that other embodiments of the disclosed process are possible as well.

As one alternate embodiment, instead of comparing a BEAVR determined for the two event prediction models in a pair to one particular estimate of how many false flags are worth trading for one catch, asset data platform 102 may compare the ratio to BEAVR of a plurality of different estimates of how many false flags are worth trading for one catch (e.g., a range of possible estimates considered to be reasonable), and the results of these comparisons may then be used as a basis for identifying which of the two event prediction models in the pair has a higher net value. In this respect, such an alternate embodiment may be used in situations where it is more preferable to evaluate the different event prediction models using multiple different estimates of how many false flags are worth trading for one catch rather than one single estimate of how many false flags are worth trading for one catch (e.g., a situation where it is difficult to pinpoint how many false flags are worth trading for one catch).

According to this alternative embodiment, asset data platform 102 may compare the different event prediction models using each respective estimate of how many false flags are worth trading for one catch to identify which of the different event prediction models is identified as having the highest net value when the respective estimate is used, which may be rereferred to as the "winning" event prediction model for the respective estimate. In turn, asset data platform 102 may use the results of this evaluation in various manners.

As one possibility, after identifying the "winning" event prediction models for the different estimates, asset data platform 102 may make a determination as to which one of these "winning" event prediction models is considered to be best (e.g., the event prediction model that is ultimately deployed). In this respect, the asset data platform's determination of which one of the "winning" event prediction models is considered to be best may take various forms. As one example, asset data platform 102 may select the event prediction model that was identified as "winning" for the greatest number of different estimates. As another example, asset data platform 102 may use a probability distribution for the different estimates to determine which "winning" event prediction model is considered to be best (e.g., by identifying the event prediction model that was identified as "winning" for the largest portion of the probability distribution). Asset data platform 102 may determine which one of these "winning" event prediction models is considered to be best in other manners as well. Once asset data platform 102 makes this determination, it may then take any of the same actions described above with reference to the platform's determination of the event prediction model having the highest net value (e.g., responsively deploying the selected event prediction model).

As another possibility, asset data platform 102 may cause an indication to be presented to a user that shows the "winning" event prediction model for each of the different estimates of how many false flags are worth trading for one catch, which may in turn prompt the user to (a) evaluate the "winning" event prediction models across the different estimates to determine which of the "winning" event prediction models the user considers to be best and then (b) cause an indication of the event prediction model selected by the user to be communicated back to asset data platform 102.

Asset data platform 102 may use its determination of the "winning" event prediction models under different estimates in other manners as well.

As another alternate embodiment, instead of performing an iterative sequence of pairwise comparisons where only the event prediction model is a pair that is found to have the higher net value is evaluated further and the event prediction model in the pair that is found to have the lower net value is eliminated from consideration, the process for comparing more than two different event predictions models may involve iterating through each possible pair of the different event prediction models, comparing the models in each pair in the same manner discussed above, and then using the results of the comparisons (e.g., the determination of which model in the pair has a higher net value, the BEAVR ratio for the models in the pair, etc.) to provide a ranking of the different event prediction models. In this embodiment, asset data platform 102 may then take various actions based on this ranking, such as selecting which event prediction model to deploy based on the ranking and/or causing an indication of the ranking to be presented a user.

Several other variations of the example embodiment described with reference to FIG. 6 may be possible as well.

Advantageously, the disclosed approach for comparing different event prediction models that are configured to preemptively predict event occurrences of the same given type improves upon the existing technology for evaluating and comparing event prediction models, which suffers from all of the problems discussed above. For instance, unlike the existing technology for evaluating and comparing event prediction models, the disclosed approach enables a data analytics platform to perform a relative comparison of different event prediction models that sufficiently accounts for the business value provided by the event prediction models. Other advantages of the disclosed approach exist as well.

In accordance with the present disclosure, the disclosed approach for comparing different event prediction models that are configured to preemptively predict event occurrences of the same given type may also be combined with a new approach for counting catches and false flags produced by the different event prediction models, which may provide further improvements over the existing technology for evaluating and comparing event prediction models.

Indeed, as discussed above, one possible way to determine the number of catches and false flags produced by an event prediction model (which is described above) is by counting catches and false flags on an individual prediction-by-prediction basis, such that each individual "true positive" prediction is counted as a separate catch and each individual "false positive" prediction is counted as a separate false flag. However, this approach for counting catches and false flags treats each individual positive prediction as though it provides the same net value, which fails to account for the fact that the net value provided by a given positive prediction depends in part on the "impact" of the given positive prediction (i.e., how effective the given positive prediction is at capturing the user's attention), and this impact typically varies depending on the nature of the one or more predictions that immediately preceded the given positive prediction.

For instance, if a given positive prediction is immediately preceded by one or more negative predictions, then the given positive prediction may provide maximum impact in terms of capturing the user's attention, because such a positive prediction represents a categorical change in the output of the event prediction model. On the other hand, if a given positive prediction is immediately preceded by one or more other positive predictions, then the given positive prediction may provide lesser impact in terms of capturing the user's attention, because such a positive prediction is merely reinforcing the one or more positive predictions that were previously output by the model. As such, counting catches and flags using an approach where each individual positive prediction is treated as though it provides the same net value tends to attribute too much net benefit to sequences of consecutive positive predictions that fall within an event window and too much net cost to sequences of consecutive positive predictions that fall outside of an event window, which could skew the comparison between different event prediction models.

To avoid this potential problem with counting catches and false flags on an individual prediction-by-prediction basis, another possible way to determine the number of catches and false flags produced by an event prediction model (which is also described above) is by grouping individual positive predictions into "alerts" and then counting catches and false flags on an alert-by-alert basis. One advantage of this approach is that, by treating sequences of positive predictions as a single positive prediction "unit" for purposes of evaluating the performance of the event prediction model, the issues associated with treating each individual positive prediction as though it provides the same net value may be avoided. Indeed, under this approach, a sequence of consecutive positive predictions is treated as a single catch—and is collectively afforded the same net value—regardless of how many individual positive predictions are within the sequence.

However, this approach for counting catches and false flags tends to count catches and false flags at too coarse a level, which may obscure differences in the accuracy (and thus the net value) of different event prediction models. One example of this problem can be illustrated with reference to FIGS. 8A-B, which show two different example sequences of predictions that may be output by two different event prediction models. In line with the discussion above, counting catches and false flags in these example sequences of predictions on an alert-by-alert basis may result in a determination that the two different event prediction models produce the same number of catches and false flags and thus provide equal net value—which obscures the fact that the event prediction model outputting the example sequence of predictions in FIG. 8B began to output the alert before the example event window (which degrades the net value of the alert) whereas the event prediction model outputting the example sequence of predictions in FIG. 8A began to output the alert right as the example event window started (which results in a maximum net value).

Another more extreme example of the problem associated with an approach that counts catches and false flags on an alert-by-alert basis is illustrated by an event prediction model that constantly outputs positive predictions when applied to a set of test data that corresponds to at least one actual event occurrence. Indeed, under this approach, such an event prediction model would be considered to output one single alert, and would be determined to produce 1 catch and 0 false flags despite the fact that the majority of the model's individual positive predictions would be considered false flags if counted on an individual prediction-by-prediction basis.

To address these and other problems with the foregoing approaches, also disclosed herein is a new approach for counting catches and false flags in a set of predictions output by an event prediction model that better accounts for the net value of the predictions output by the event prediction model by evaluating both the potential net value of the predictions (e.g., in terms of correctly notifying a user that an event occurrence is forthcoming) and also the impact of the predictions (e.g., in terms of effectively capturing the user's attention with a prediction).

Figure 9:
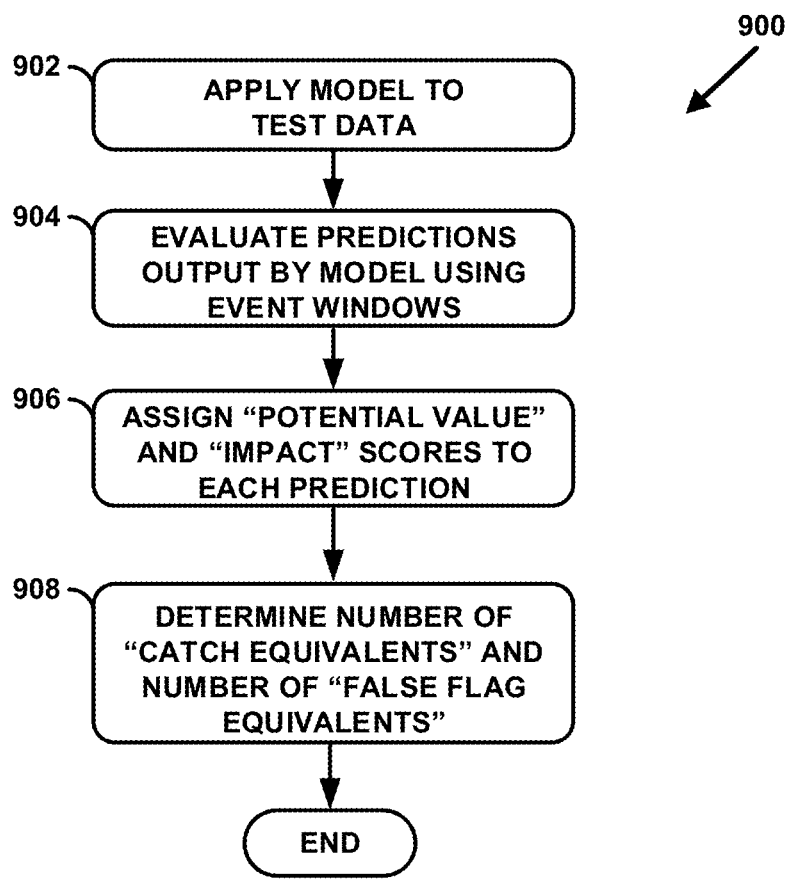
FIG. 9. is a flow diagram showing some example operations that may be included in a process for counting catches and false flags in a set of predictions output by an event prediction model that is configured to preemptively predict event occurrences of a given type.

Referring now to FIG. 9, a functional block diagram 900 is provided that illustrates one example embodiment of the disclosed process for counting catches and false flags in a set of predictions output by an event prediction model that is configured to preemptively predict event occurrences of a given type. For the purposes of illustration, the example operations are described as being carried out by asset data platform 102, but it should be understood that data analytics platforms other than asset data platform 102 may perform the example operations. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 9, the disclosed process may begin at block 902 with asset data platform 102 applying the event prediction model to a given set of test data that comprises historical time-series values for a set of input variables from a period of time during which there are known instances of actual event occurrences of the given type, which may result in the event prediction model outputting a respective set of predictions of whether an event occurrence of the given type is forthcoming that are classified either as positive predictions (i.e., a prediction that an event occurrence is forthcoming) or negative predictions (i.e., (i.e., a prediction that an event occurrence is not forthcoming). In this respect, the function carried out by asset data platform 102 at block 902 of FIG. 9 may be similar to the function carried out by asset data platform 102 at block 602 of FIG.

Next, at block 904, asset data platform 102 may evaluate the set of predictions output by the event prediction model using event windows for the known instances of actual event occurrences that correspond to the given set of test data. In this respect, the function carried out by asset data platform 102 at block 904 of FIG. 9 may again be similar to the function carried out by asset data platform 102 at block 604 of FIG. 6, and the respective event windows for known instances of actual event occurrences used at block 904 may also generally be similar to the respective event windows for known instances of actual event occurrences used at block 904. In this respect, in one implementation, the beginning and end points of the event windows of block 904 may be established using the same lengths of time in advance of an actual event occurrence that are used to establish the event windows of block 604. However, in another implementation, the beginning and/or end points of the event windows of block 904 may be established using different lengths of time in advance of an actual event occurrence than those used to establish the event windows of block 604.

Referring now to block 906 of FIG. 9, while asset data platform 102 is evaluating the set of predictions output by the different event prediction model using event windows for the known instances of actual event occurrences, asset data platform 102 may assign each individual prediction in the set two types of "scores": (1) a "potential value" score and (2) an "impact" score. Each of these types of scores will now be described in further detail.

Beginning with the first of these score types, a "potential value" score generally serves as a measure of the potential net value of an individual prediction assuming a maximum possible impact, where the particular "potential value" score assigned to each individual prediction depends on when the prediction was output relative to an event window of an actual event occurrence. In this respect, the scoring system that is used to assign the particular "potential value" scores to the individual predictions output by the event prediction model may take various forms.

According to one possible scoring system, asset data platform 102 may be configured to (1) assign a maximum "potential value" score to any prediction falling within an event window for an actual event occurrence, which may be a positive number (e.g., +1) to reflect that outputting a positive prediction while within an event window of an actual event occurrence typically results in a net benefit and (2) assign a minimum "potential value" score to any prediction falling outside of any event window for an actual event occurrence, which may be a negative number (e.g., −1) to reflect that outputting a positive prediction outside of any event window of an actual event occurrence typically results in a net cost. In this respect, it should be understood that positive and negative predictions are treated the same under this scoring system for assigning "potential value" scores (e.g., a prediction falling within an event window may be assigned a maximum "potential value" score regardless of whether it is a positive or negative prediction), and that the difference between positive and negative predictions is then accounted for by the "impact" score assigned to the prediction, which is discussed in further detail below.

Based on the foregoing, it will be appreciated that the above scoring system for assigning "potential value" scores can take the form of a time-dependent step function that assigns a minimum "potential value" score to a positive prediction output at any point prior to an event window for an actual occurrence, steps up to a maximum "potential value" score at the beginning point of an event window for an actual occurrence and assigns the maximum "potential value" score to a positive prediction output at any point within the event window, and then steps back down to the minimum "potential value" score at the end point of the event window. In this respect, the above scoring system provides a simple estimate of how the potential net value of a prediction may vary depending on the outcome and timing of the prediction, which may be sufficient in some circumstances. However, in other circumstances, it may be desirable to use a modified version of the above scoring system that provides a more complex estimate of how the potential net value of a prediction may vary depending on the outcome and timing of the prediction.

For instance, one possible modification to the above scoring system may involve the insertion of a "ramp-up" period immediately prior to the event window during which the output of the time-dependent function representing the "potential value" score more gradually increases from the minimum "potential value" score to the maximum "potential value" score. According to such a scoring system, any positive predictions output during this "ramp-up" period may then be assigned a "potential value" score that is somewhere in between the minimum "potential value" score to the maximum "potential value" score, where a positive prediction closer to beginning point of the "ramp-up" period (and thus further away from the beginning point of the event window) may generally be assigned a "potential value" score closer to the minimum and a positive prediction closer to end point of the "ramp-up" period (and thus closer to the beginning point of the event window) may generally be assigned a "potential value" score closer to the maximum. In practice, this modified version of the above scoring system may provide a more accurate estimate of the potential net value of positive predictions that are output immediately before an event window, particularly in circumstances where the length of the event windows is uncertain.

Another possible modification to the above scoring system may involve assigning different "potential value" scores to positive predictions at different points along the event window, which may be desirable in circumstances where it appears that the net benefit resulting from a positive prediction may vary depending when the positive prediction is output within an event window.

Yet another possible modification to the above scoring system may involve treating negative predictions differently from positive predictions, such that the "potential value" scores assigned to negative predictions differ from the "potential value" scores assigned to positive predictions. For example, in some circumstances, it may be desirable to assign "potential value" scores to negative predictions that are lower than the "potential value" scores assigned to positive predictions and/or to assign certain negative predictions a "potential value" score of 0.

The scoring system that is used to assign the particular "potential value" scores to the individual predictions output by the event prediction model may take other forms as well.

Turning to the second type of score assigned to the predictions output by the event prediction model, an "impact" score generally serves as a measure of the impact of an individual prediction (e.g., in terms of effectively capturing a user's attention), where the particular "impact" score assigned to each individual prediction may depend on (1) whether the prediction is a positive prediction and (2) how the prediction relates to one or more preceding predictions output by the event predication model. In this respect, the scoring system that is used to assign the particular "impact" scores to the individual predictions output by the event prediction model may take various forms.

According to one possible scoring system, asset data platform 102 may be configured to (1) group the individual predictions output by the event prediction model into alerts, (2) within each alert, assign each positive prediction an "impact" score in accordance with an "impact" function that generally assigns higher "impact" scores to predictions that are earlier in the sequence of predictions included within the alert and lower "impact" scores to predictions that are later in the sequence of predictions included within the alert, and (3) within each alert, assign each negative prediction an "impact" score of 0.

When using the above scoring system, the manner in which assert data platform 102 groups the individual predictions into alerts for purposes of assigning the "impact" scores may take various forms. In one implementation, asset data platform 102 may begin with the earliest prediction output by the event prediction model and proceed in time order until it reaches the first positive prediction output by the event prediction model, at which point asset data platform 102 may (1) designate the output time of the first positive prediction as the starting point of a new first alert, (2) determine the ending point of the new alert based on the starting point of the first alert and a fixed duration that is to be used for each alert (e.g., a duration that matches the length of an event window), and (3) group the sequence of predictions output by the event prediction model between the starting point and the ending point together into the first alert of the fixed duration. From there, asset data platform 102 may begin with the prediction immediately following the first alert and again proceed in time order until assert data platform 102 reaches the next positive prediction output by the event prediction model (which could potentially be the prediction immediately following the first alert but may otherwise be a prediction that is later in time). Once asset data platform 102 reaches the next positive prediction after the first alert, asset data platform 102 may use a similar approach to define a new second alert of the fixed duration, and may then continue in a similar manner until it reaches the end of the set of predictions output by the event prediction model.

The manner in which assert data platform 102 groups the individual predictions into alerts for purposes of assigning the "impact" scores may take other forms as well.

Further, when using the above scoring system, the manner in which the positive predictions within an alert are assigned "impact" scores in accordance with an "impact" function may take various forms. In one implementation, the "impact" function may take the form of a time-dependent exponential decay function that outputs a maximum "impact" score at the starting point of each alert and then outputs decaying "impact" scores from the starting point of the alert to the end point of the alert. Thus, in such an implementation, asset data platform 102 may assign an "impact" score to each positive prediction in an alert by identifying the relative output time of the positive prediction within the alert and then determining the output of the alert-specific exponential decay function that corresponds to that relative output time. (In this implementation, it should also be understood that each negative prediction in an alert may still be assigned an "impact" score of 0 while the output of the exponential decay function may continue to decay in the background).

The manner in which the positive predictions within an alert are assigned "impact" scores in accordance with an "impact" function may take other forms as well.

As with the scoring system for assigning the "potential value" scores, it may also be desirable to use a modified version of the above scoring system for assigning "impact" scores in some circumstances.

For instance, one possible modification to the above scoring system may involve grouping the individual predictions into alerts using criteria similar to that described above with respect to block 606 of FIG. 6, rather than using a fixed duration for each alert. Another possible modification to the above scoring system may involve assigning "impact" scores to positive predictions within an alert in accordance with an "impact" function other than an exponential decay function. Yet another possible modification to the above scoring system may involve assigning non-zero impact scores to negative predictions, which may be desirable in circumstances where it appears that there may be some non-zero impact resulting from outputting negative predictions to a user (e.g., a negative "impact" score to reflect that a user appears to pay less attention to the possibility of an event occurrence when being presented with a negative prediction).

The scoring system that is used to assign the particular "impact" scores to the individual predictions output by the event prediction model may take other forms as well.

An illustration of how "potential value" and "impact" scores may be assigned to the examples sequences of predictions shown in FIGS. 7A-D is provided by FIGS. 10A-D. As shown, each of FIGS. 10A-D comprises two different graphs: (1) a first graph having an x-axis 1002 that indicates the time of the model's output relative to the actual event occurrence and a y-axis 1004 that indicates whether the model's output was a "Yes" prediction or a "No" prediction, and (2) a second graph having the same x-axis 1002 and a y-axis 1006 that indicates a magnitude of the "potential value" and "impact" scores assigned to the predictions. Further, each of FIGS. 10A-D shows an example event window for an actual event occurrence that begins shortly before $T_{e-4}$ and ends shortly after $T_{e-1}$, along with an example "ramp-up" period (illustrated with gray shading) that begins shortly after $T_{e-6}$ and ends at the beginning point of the example event window. Further yet, each of FIGS. 10A-D shows a curve 1008 that represents one example of how the potential net value of a positive prediction may vary depending the timing of the positive prediction relative to the example event window.

Figure 10A:
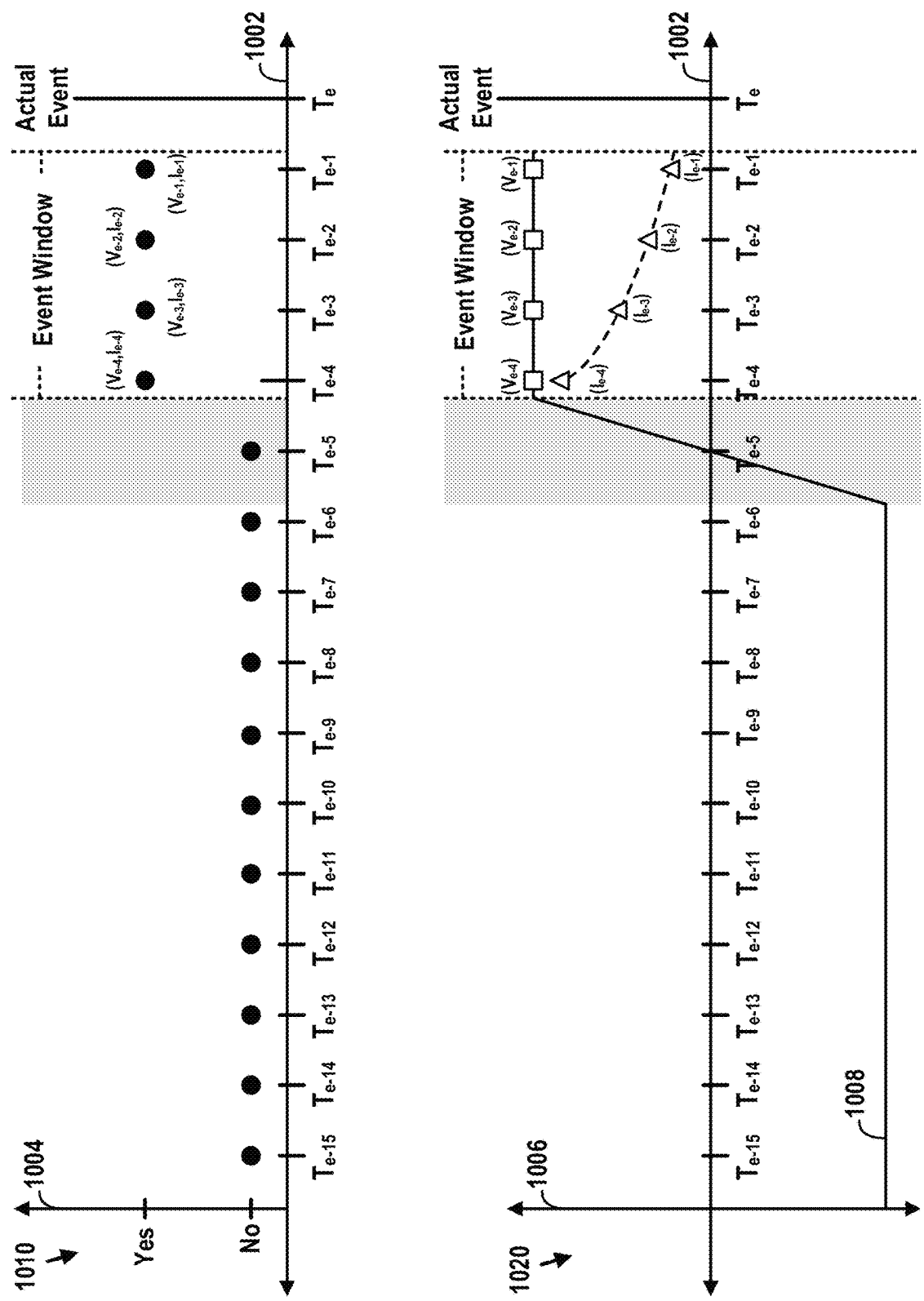
FIGS. 10A-D depict graphs that illustrate how "potential value" and "impact" scores may be assigned to the examples sequences of predictions shown in FIGS. 7A-D.

Turning to the individual figures, FIG. 10A illustrates how "potential value" and "impact" scores may be assigned to the example sequence of predictions of FIG. 7A. As shown in FIG. 10A, there is a sequence of 4 consecutive positive predictions that each fall within the example event window, and thus each of these positive predictions may be assigned a maximum "potential value" score (which is indicated by $V_{e-4}$, $V_{e-3}$, $V_{e-2}$, and $V_{e-1}$). Further, in the example of FIG. 10A, the sequence of 4 consecutive positive predictions are (1) grouped into a single alert having a fixed duration that encompasses four time units and (2) assigned "impact" scores in accordance with an exponential decay function that outputs a maximum "impact" score at $T_{e-4}$ (which is the starting point of the alert) and then outputs a decaying "impact" score between $T_{e-4}$ and $T_{e-1}$ (which is the ending point of the alert). These "impact" scores are indicated by $I_{e-4}$, $I_{e-2}$, and $I_{e-1}$ in FIG. 10A.

Figure 10B:
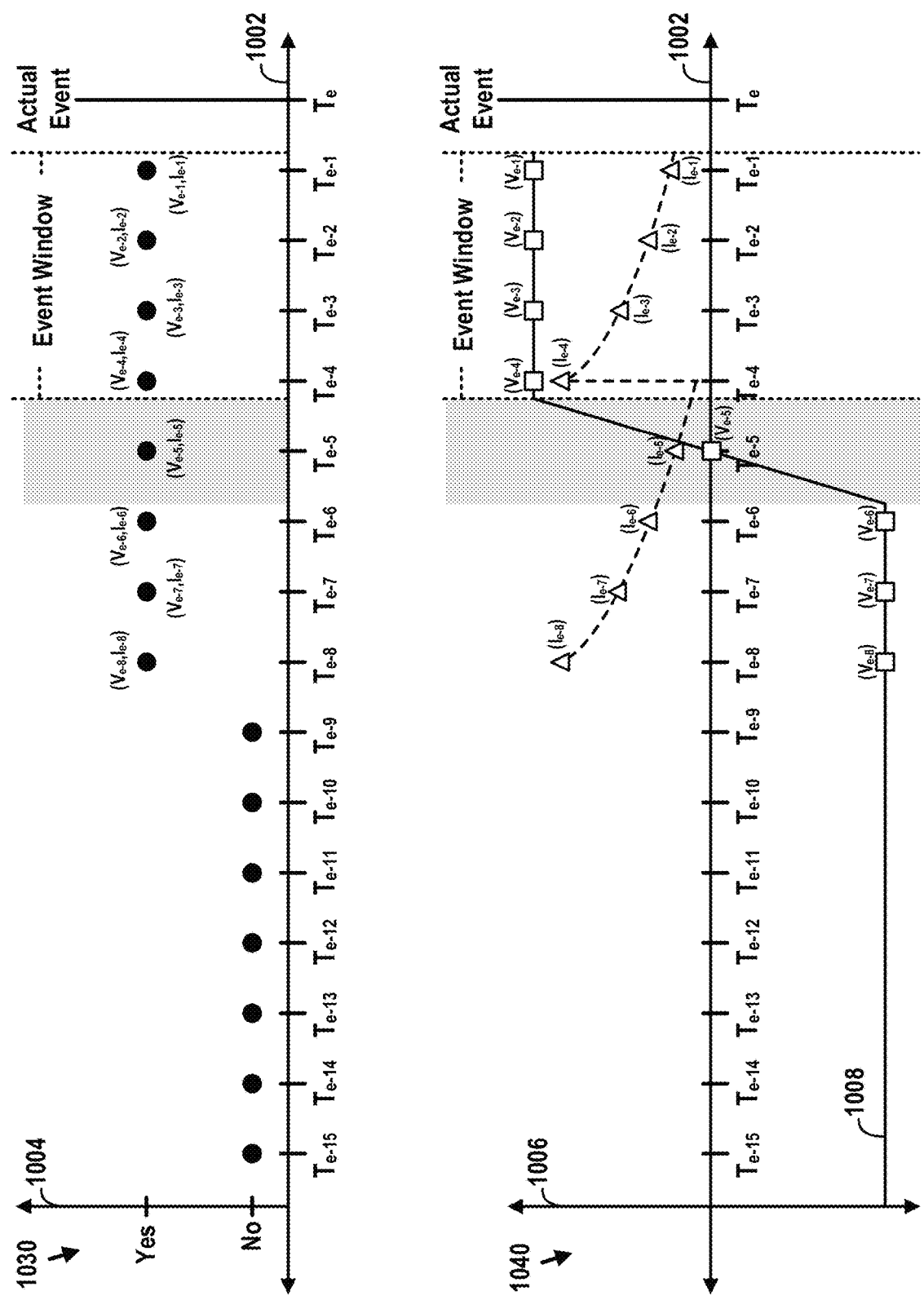

FIG. 10B illustrates how "potential value" and "impact" scores may be assigned to the example sequence of predictions of FIG. 7B. As shown in FIG. 10B, there is a sequence of 8 consecutive positive predictions, where the first 3 positive predictions fall outside of both the example event window and the example "ramp-up" period, the next positive prediction falls within the example "ramp-up" period, and the last 4 positive predictions fall within the example event window. In this example, the 3 positive predictions that fall outside of both the example event window and the example "ramp-up" period are each assigned a minimum "potential value" score (which is indicated by $V_{e-8}$, $V_{e-7}$, and $V_{e-6}$), the 1 positive prediction that falls within the example "ramp-up" period is assigned a "potential value" score of 0 (which is indicated by $V_{e-5}$), and the 4 positive predictions fall within the example event window are each assigned a maximum "potential value" score (which is indicated by $V_{e-4}$, $V_{e-3}$, $V_{e-2}$, and $V_{e-1}$).

Further, in the example of FIG. 10B, the 8 positive predictions in the sequence are grouped into two alerts that each have a fixed duration encompassing four time units: (1) a first alert that includes the positive predictions at $T_{e-8}$, $T_{e-7}$, $T_{e-6}$, and $T_{e-5}$, and (2) a second alert that includes the positive predictions at $T_{e-4}$, $T_{e-3}$, $T_{e-2}$, and $T_{e-1}$. In turn, the positive predictions in each alert may be assigned "impact" scores in accordance with a respective alert-specific exponential decay function, where (1) the first alert's exponential decay function outputs a maximum "impact" score at $T_{e-8}$ (which is the starting point of the first alert) and then outputs a decaying "impact" score between $T_{e-8}$ and $T_{e-5}$ (which is the ending point of the second alert) and (2) the second alert's exponential decay function outputs a maximum "impact" score at $T_{e-4}$ (which is the starting point of the second alert) and then outputs a decaying "impact" score between $T_{e-4}$ and $T_{e-1}$ (which is the ending point of the second alert. These "impact" scores are indicated by $I_{e-8}$, $I_{e-2}$, and $I_{e-1}$ in FIG. 10B.

Figure 10C:
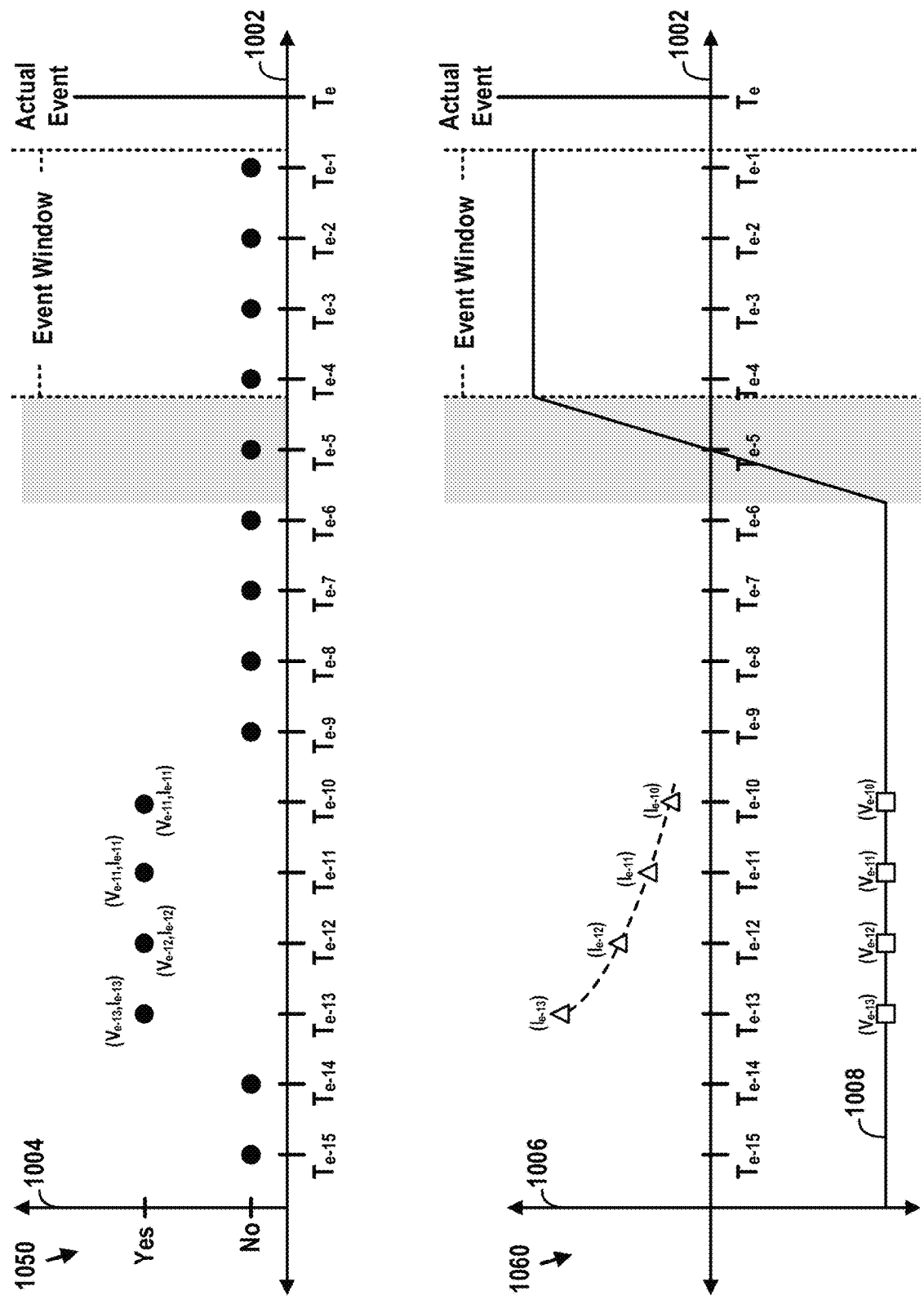

FIG. 10C illustrates how "potential value" and "impact" scores may be assigned to the example sequence of predictions of FIG. 7C. As shown in FIG. 10C, there is a sequence of 4 consecutive positive predictions that each fall outside of both the example event window and the example "ramp up" period, and thus each of these positive predictions may be assigned a minimum "potential value" score (which is indicated by $V_{e-13}$, $V_{e-12}$, $V_{e-11}$, and $V_{e-10}$). Further, in the example of FIG. 10C, the sequence of 4 consecutive positive predictions are (1) grouped into a single alert having a fixed duration that encompasses four time units and (2) assigned "impact" scores in accordance with an exponential decay function that outputs a maximum "impact" score at $T_{e-13}$ (which is the starting point of the alert) and then outputs a decaying "impact" score between $T_{e-13}$ and $T_{e-10}$ (which is the ending point of the alert). These "impact" scores are indicated by $I_{e-13}$, $I_{e-12}$, and $I_{e-10}$ in FIG. 10C.

Figure 10D:
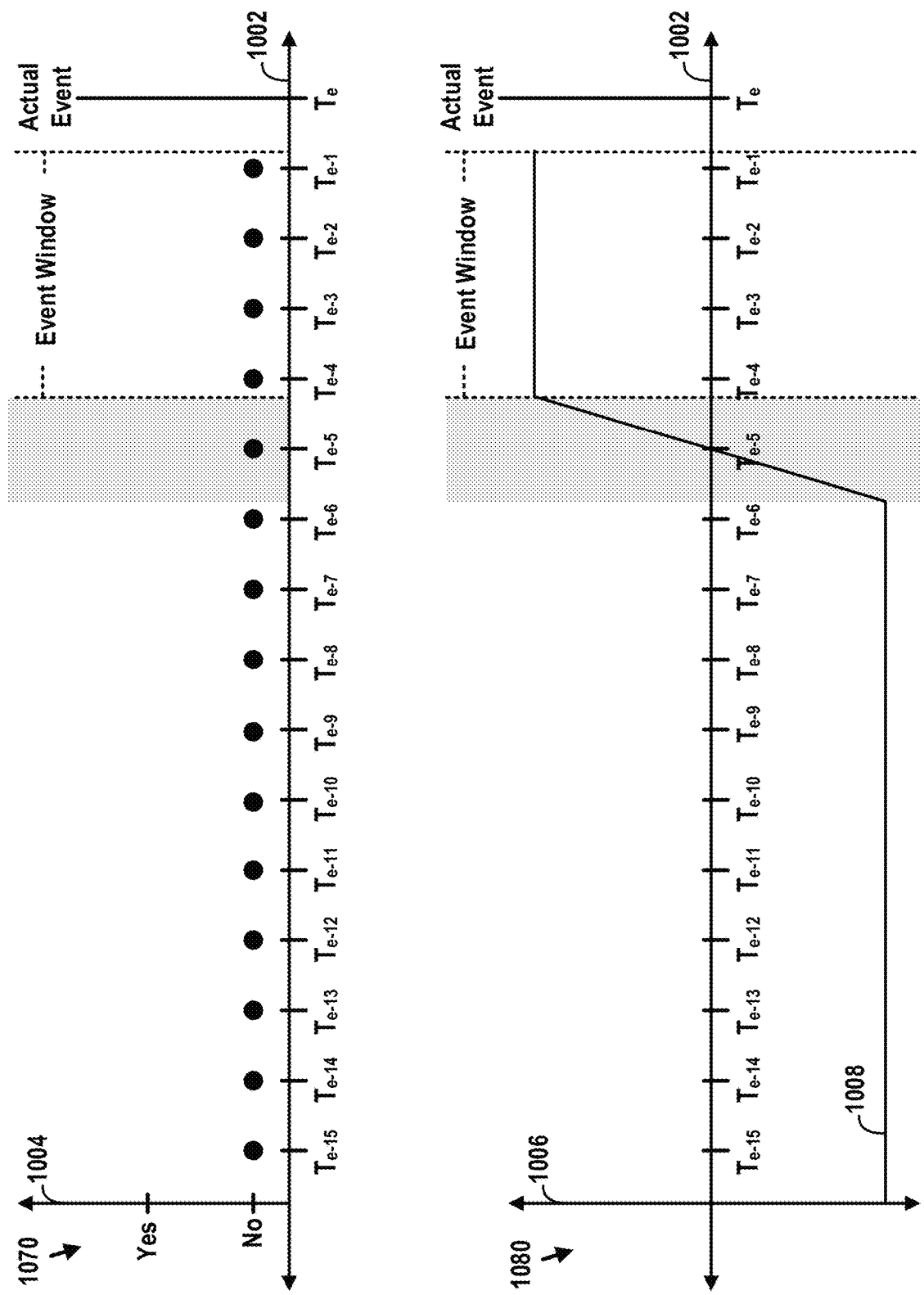

Lastly, FIG. 10D illustrates how "potential value" and "impact" scores may be assigned to the example sequence of predictions of FIG. 7D. As shown in FIG. 10D, the example sequence includes only negative predictions, and thus in this example, the "potential value" and "impact" scores of the predictions are all 0. However, as discussed above, there may be other examples where negative predictions may be assigned non-zero "potential value" scores and/or non-zero "impact" scores.

While the examples discussed above show that the predictions have been output by the event prediction model at regular time intervals, it should be understood that in practice, there may be situations where an event prediction model outputs its predictions at irregular time intervals. In these situations, asset data platform 102 may be configured to map the predictions output by the event prediction model to a uniform time scale having uniformly-spaced time units, such that a prediction falling between any two time units of the uniform time scale may be "carried forward" to the next time unit and treated as though it was output at that time unit. In this respect, if multiple predictions fall between two time units of the uniform time scale, asset data platform 102 may aggregate the predictions in some manner (e.g., by adopting the prediction that is latest in time and/or averaging the predictions) and then map the aggregated prediction to the next time unit in the uniform time scale, among other possibilities. Further, in practice, asset data platform 102 may be configured to carry out the mapping to the uniform time scale either before the "net value" and "impact" scores have been assigned to the predictions (in which case the scores are assigned to the predictions according to their mapped output time) or after the "net value" and "impact" scores have been assigned to the predictions (in which case the scores are assigned to the predictions according to their original output time but are aggregated for purposes of determining of catch equivalents and false flag equivalents based on their mapped output times).

Referring now to block 908 of FIG. 9, after asset data platform 102 has assigned a "potential value" score and an "impact" score to each individual prediction output by the event prediction model, asset data platform 102 may use these scores to determine a number of "catch equivalents" and a number of "false flag equivalents" produced by the event prediction model, where these "catch equivalents" and "false flag equivalents" numbers may be used in place of the "catch" and "false flag" numbers that may be determined using other counting approaches. In this respect, the manner in which the assigned "potential value" and "impact" scores are used to determine the "catch equivalents" and "false flag equivalents" numbers produced by the event prediction model may take various forms.

In one implementation, asset data platform 102 may determine the number of catch equivalents produced by the event prediction model by (1) identifying the individual predictions output by the event prediction model that have been assigned positive "potential value" scores, which are deemed to be the "catch" predictions, (2) for each "catch" prediction, multiply the prediction's assigned "potential value" score by its assigned "impact" score, which may produce an "actual value" score for the prediction (i.e., a measure of the actual net value provided by the prediction that takes both the potential net value and the actual impact of the prediction into account), and (3) aggregate the "actual value" scores for the "catch" predictions to produce the total number of catch equivalents produced by the event prediction model.

In turn, asset data platform 102 may determine the number of false flag equivalents produced by the event prediction model by (1) identifying the individual predictions output by the event prediction model that have been assigned negative "potential value" scores, which are deemed to be the "false flag" predictions, (2) for each "false flag" prediction, multiply the prediction's assigned "potential value" score by its assigned "impact" score, which may produce an "actual value" score for the prediction (i.e., a measure of the actual net value provided by the prediction takes both the potential net value and the actual impact of the prediction into account), and (3) aggregate the "actual value" scores for the "false flag" predictions to produce the total number of false flag equivalents produced by the event prediction model.

The manner in which the assigned "potential value" and "impact" scores are used to determine the "catch equivalents" and "false flag equivalents" numbers produced by the event prediction model may take other forms as well.

In practice, it may also be desirable to have the "catch equivalents" and "false flag equivalents" numbers determined using the disclosed counting approach represented on the same general scale as the "catch" and "false flag" numbers that may be determined using another counting approach (e.g., to enable the numbers determined using these different approaches to be compared with one another). One way to achieve this result may be to start with a few foundational premises that are consistent with the goal of having "catch equivalents" and "false flag equivalents" represented on the same general scale as the "catch" and "false flag" numbers, and then tuning the scoring systems for assigning the "potential value" and "impact" scores to comply with these foundational premises.

For instance, one such premise may be that a "perfect catch"—which is a sequence of predictions that comprises all negative predictions prior to an event window for an actual event occurrence followed by all positive predictions within the event window—should be assigned an aggregate "real value" score of +1 so that it counts as one full "catch equivalent." Thus, to comply with this premise, asset data platform 102 may determine what magnitudes should be used for the "potential value" and "impact" scores that are assigned to positive predictions falling within the event window such that the "real value" scores of these positive predictions aggregate to +1. In this respect, one possible way to achieve this result is by setting the "potential value" score assigned to each positive prediction falling within an event window to +1 and then defining an "impact" function that produces an output having an area under the curve of +1 within an alert period of the same duration as the event window. However, asset data platform 102 may determine the "potential value" and "impact" scores that should be assigned to positive predictions falling within the event window in other manners as well.

Another premise may be that a "perfect false flag"— which is an alert comprised of all positive predictions that is entirely outside of an event window (or a "ramp-up" period) for an actual event occurrence followed by all negative predictions within the event window—should be assigned an aggregate "real value" score of −1 so that it counts as one full "false flag equivalent." Thus, to comply with this premise, asset data platform 102 may determine what magnitudes should be used for the "potential value" and "impact" scores that are assigned to positive predictions falling outside the event window such that the "real value" scores of these positive predictions aggregate to −1. In this respect, one possible way to achieve this result is by setting the "potential value" score assigned to each positive prediction falling outside of an event window to −1 and then defining an "impact" function that produces an output having an area under the curve of +1 within an alert period of the same duration as the event window. However, asset data platform 102 may determine the "potential value" and "impact" scores that should be assigned to positive predictions outside of the event window in other manners as well.

To the extent it is desirable to have the "catch equivalents" and "false flag equivalents" numbers determined using the disclosed counting approach represented on the same general scale as the "catch" and "false flag" numbers that may be determined using another counting approach, the manner in which asset data platform 102 may tune the scoring systems for assigning the "potential value" and "impact" scores to achieve this goal may take other forms as well.

Once asset data platform 102 has determined the number of "catch equivalents" and the number of "false flag equivalents" produced by the event prediction model, asset data platform 102 may then use these "catch equivalents" and "false flag equivalents" numbers in various manners.

As one possibility, asset data platform 102 may use the "catch equivalents" and "false flag equivalents" numbers in any of the same ways that asset data platform 102 may otherwise use "catch" and "false flag" numbers for an event prediction model, including for purposes of evaluating and/or comparing event prediction models. For example, asset data platform 102 may use "catch equivalents" and "false flag equivalents" numbers determined using the disclosed counting approach in place of "catch" and "false flag" numbers determined using another counting approach when performing the disclosed process of comparing different event prediction models to determine which of the different event prediction models provides the highest net value (including in particular the functions of blocks 610-620). As another example, asset data platform 102 may use "catch equivalents" and "false flag equivalents" numbers determined using the disclosed counting approach in place of "catch" and "false flag" numbers determined using another counting approach when providing a user with information regarding the performance of an event prediction model, such as the number of catches and false flags produced by the model, a ratio between the number of false flags and the number of catches produced by the model, etc.

Asset data platform 102 may use the "catch equivalents" and "false flag equivalents" numbers for other purposes and/or in other manners as well.

While the disclosed approaches for comparing different event prediction models and counting catches and false flags produced by event prediction models have been described above for purposes of illustration in the context of an asset data platform, it should be understood that the disclosed approaches are not limited to this context. Rather, the disclosed approaches may be used in connection with any event prediction models that are configured to preemptively predict event occurrences, which may be employed in any of various technical fields.

VI. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

What is claimed is:

1. A computing system comprising:
a communication interface;
at least one processor;
a non-transitory computer-readable medium; and
program instructions stored on the non-transitory computer-readable medium that are executable by the at least one processor to cause the computing system to perform functions comprising:
using one or more machine learning techniques to train two different event prediction models that are each configured to preemptively predict event occurrences of a given type;
applying each of the two different event prediction models to a set of test data associated with known instances of actual event occurrences of the given type and thereby causing each of the two different event prediction models to output a respective set of predictions of whether an event occurrence of the given type is forthcoming;
evaluating the respective set of predictions output by each of the two different event prediction models using event windows for the known instances of actual event occurrences and thereby determining a respective number of catches and a respective number of false flags produced by each of the two different event prediction models;
based on the respective number of catches and the respective number of false flags produced by each of the two different event prediction models, identifying which given one of the two different event prediction models provides a higher net value by:
determining whether the respective numbers of catches produced by the two different event prediction models are the same or different and then (a) if the respective numbers of catches produced by the two different event prediction models are determined to be the same, identifying whichever one of the two different event prediction models produced a lesser number of false flags as the given one of the two different event prediction models, or (b) if the respective numbers of catches produced by the two different event prediction models are determined to be different such that a first one of the two different event prediction models produced a greater number of catches than a second one of the two different event prediction models:
determining a ratio between (1) a first difference between the respective number of false flags produced by the first one of the two different event prediction models and the respective number of false flags produced by the second one of the two different event prediction models and (2) a second difference between the respective number of catches produced by the first one of the two different event prediction models and the respective number of catches produced by the second one of the two different event prediction models; and
determining whether the ratio is less than an estimate of how many false flags are worth trading for one catch and then (1) if the ratio is less than the estimate, identifying the first one of the two different event prediction models as the given one of the two different event prediction models, or (2) if the ratio is not less than the estimate, identifying the second one of the two different event prediction models as the given one of the two different event prediction models; and
after identifying the given one of the two different event prediction models that provides the higher net value, causing a client station associated with a given user to present an indication that the given one of the two different event prediction models provides the higher net value.

2. The computing system of claim 1, further comprising program instructions stored on the non-transitory computer-readable medium that are executable by the at least one processor to cause the computing system to perform functions comprising:
in response to identifying the given one of the two different event prediction models that provides the higher net value, deploying the given one of the two different event prediction models.

3. The computing system of claim 1, wherein determining the respective number of catches and the respective number of false flags produced by each of the two different event prediction models comprises determining a respective number of catch equivalents and a respective number of false-flag equivalents produced by each of the two different event prediction models, and wherein determining the respective number of catch equivalents and the respective number of false-flag equivalents produced by each respective event prediction model of the two different event prediction models comprises:
assigning each prediction in the respective set of predictions output by the respective event prediction model a respective potential-value score and a respective impact score;
determining the respective number of catch equivalents produced by the respective event prediction model by (1) identifying a first subset of the set of predictions output by the respective event prediction model that have been assigned positive potential-value scores, (2) for each respective prediction in the first subset, determining a respective actual-value score for the respective prediction by multiplying the respective potential-value score assigned to the respective prediction by the respective impact score assigned to the respective prediction, and (3) aggregating the respective actual-value scores for the respective predictions in the first subset to produce a total actual-value score for the first subset, wherein the total actual-value score for the first subset comprises the respective number of catch equivalents produced by the respective event prediction model; and determining the respective number of false-flag equivalents produced by the respective event prediction model by (1) identifying a second subset of the set of predictions output by the respective event prediction model that have been assigned negative potential-value scores, (2) for each respective prediction in the second subset, determining a respective actual-value score for the respective prediction by multiplying the respective potential-value score assigned to the respective prediction by the respective impact score assigned to the respective prediction, and (3) aggregating the respective actual-value scores for the respective predictions in the second subset to produce a total actual-value score for the second subset, wherein the total actual-value score for the second subset comprises the respective number of false-flag equivalents produced by the respective event prediction model.

4. The computing system of claim 1, wherein determining the respective number of catches and the respective number of false flags produced by each of the two different event prediction models comprises determining the respective number of catches and the respective number of false flags on a prediction-by-prediction basis.

5. The computing system of claim 1, wherein determining the respective number of catches and the respective number of false flags produced by each of the two different event prediction models comprises determining the respective number of catches and the respective number of false flags on an alert-by-alert basis.

6. The computing system of claim 1, wherein the indication that the given one of the two different event prediction models provides the higher net value comprises (1) an identification of the given one of the two different event prediction models and (2) an indication of the respective number of catches and the respective number of false flags produced by the given one of the two different event prediction models.

7. The computing system of claim 1, wherein the event occurrences of the given type comprise occurrences of a group of one or more asset failures.

8. A computing system comprising:
a communication interface;
at least one processor;
a non-transitory computer-readable medium; and
program instructions stored on the non-transitory computer-readable medium that are executable by the at least one processor to cause the computing system to perform functions comprising:
using one or more machine learning techniques to train an event prediction model that is configured to preemptively predict event occurrences of a given type;
applying the event prediction model to a set of test data associated with known instances of actual event occurrences of the given type and thereby causing the event prediction model to output a set of predictions of whether an event occurrence of the given type is forthcoming;
evaluating the set of predictions output by the event prediction model using event windows for the known instances of actual event occurrences and thereby determining a number of catch equivalents and a number of false-flag equivalents produced by the event prediction model by:
assigning each prediction in the set of predictions output by the event prediction model a respective potential-value score and a respective impact score;
determining the number of catch equivalents produced by the event prediction model by (1) identifying a first subset of the set of predictions output by the event prediction model that have been assigned positive potential-value scores, (2) for each respective prediction in the first subset, determining a respective actual-value score for the respective prediction by multiplying the respective potential-value score assigned to the respective prediction by the respective impact score assigned to the respective prediction, and (3) aggregating the respective actual-value scores for the respective predictions in the first subset to produce a total actual-value score for the first subset, wherein the total actual-value score for the first subset comprises the number of catch equivalents produced by the event prediction model; and
determining the number of false-flag equivalents produced by the event prediction model by (1) identifying a second subset of the set of predictions output by the event prediction model that have been assigned negative potential-value scores, (2) for each respective prediction in the second subset, determining a respective actual-value score for the respective prediction by multiplying the respective potential-value score assigned to the respective prediction by the respective impact score assigned to the respective prediction, and (3) aggregating the respective actual-value scores for the respective predictions in the second subset to produce a total actual-value score for the second subset, wherein the total actual-value score for the second subset comprises the number of false-flag equivalents produced by the event prediction model; and
after determining the number of catch equivalents and the number of false-flag equivalents produced by the event prediction model, causing a client station associated with a given user to present an indication of the number of catch equivalents and the number of false-flag equivalents produced by the event prediction model.

9. The computing system of claim 8, further comprising program instructions stored on the non-transitory computer-readable medium that are executable by the at least one processor to cause the computing system to perform functions comprising:
based on the number of catch equivalents and the number of false-flag equivalents produced by the event prediction model, deciding to deploy the event prediction model; and
in response to the deciding, deploying the event prediction model.

10. The computing system of claim 9, wherein deciding to deploy the event prediction model based on the number of catch equivalents and the number of false-flag equivalents produced by the event prediction model comprises:
  using the number of catch equivalents and the number of false-flag equivalents produced by the event prediction model as a basis for comparing the event prediction model to one or more other event prediction models; and
  based on the comparing, determining that the event prediction model provides a higher net value than the one or more other event prediction models.

11. The computing system of claim 8, wherein assigning each prediction in the set of predictions output by the event prediction model the respective potential-value score comprises, for each respective prediction in the set of predictions:
  if the respective prediction falls within any respective event window for any one of the known instances of actual event occurrences, assigning a maximum potential-value score to the respective prediction;
  if the respective prediction falls within any ramp-up period that corresponds to any respective event window for any one of the known instances of actual event occurrences, assigning a potential-value score that is lower than the maximum potential-value score and higher than a minimum potential-value score to the respective prediction; or
  if the respective prediction does not fall within any respective event window or any corresponding ramp-up period for any one of the known instances of actual event occurrences within any ramp-up period that corresponds to any event respective window for any one of the known instances of actual event occurrences, assigning the minimum potential-value score to the respective prediction.

12. The computing system of claim 8, wherein assigning each prediction in the set of predictions output by the event prediction model the respective impact score comprises:
  grouping the predictions in the set of predictions output by the event prediction model into alerts; and
  within each respective alert, (a) assigning each respective prediction in the respective alert that is positive a non-zero impact score in accordance with an exponential decay function that outputs a maximum impact score at the beginning point of the respective alert and then outputs a decaying impact score from the beginning point of the respective alert to the end point of the respective alert, and (b) assigning each respective prediction in the respective alert that is negative an impact score of zero.

13. The computing system of claim 8, further comprising program instructions stored on the non-transitory computer-readable medium that are executable by the at least one processor to cause the computing system to perform functions comprising:
  before assigning each prediction in the set of predictions output by the event prediction model the respective potential-value score and the respective impact score, mapping the set of predictions output the event prediction model to a uniform time scale.

14. A computer-implemented method carried out by a computing system, the method comprising:
  using one or more machine learning techniques to train two different event prediction models that are each configured to preemptively predict event occurrences of a given type;
  applying each of the two different event prediction models to a set of test data associated with known instances of actual event occurrences of the given type and thereby causing each of the two different event prediction models to output a respective set of predictions of whether an event occurrence of the given type is forthcoming;
  evaluating the respective set of predictions output by each of the two different event prediction models using event windows for the known instances of actual event occurrences and thereby determining a respective number of catches and a respective number of false flags produced by each of the two different event prediction models;
  based on the respective number of catches and the respective number of false flags produced by each of the two different event prediction models, identifying which given one of the two different event prediction models provides a higher net value by:
    determining whether the respective numbers of catches produced by the two different event prediction models are the same or different and then (a) if the respective numbers of catches produced by the two different event prediction models are determined to be the same, identifying whichever one of the two different event prediction models produced a lesser number of false flags as the given one of the two different event prediction models, or (b) if the respective numbers of catches produced by the two different event prediction models are determined to be different such that a first one of the two different event prediction models produced a greater number of catches than a second one of the two different event prediction models:
      determining a ratio between (1) a first difference between the respective number of false flags produced by the first one of the two different event prediction models and the respective number of false flags produced by the second one of the two different event prediction models and (2) a second difference between the respective number of catches produced by the first one of the two different event prediction models and the respective number of catches produced by the second one of the two different event prediction models; and
      determining whether the ratio is less than an estimate of how many false flags are worth trading for one catch and then (1) if the ratio is less than the estimate, identifying the first one of the two different event prediction models as the given one of the two different event prediction models, or (2) if the ratio is not less than the estimate, identifying the second one of the two different event prediction models as the given one of the two different event prediction models; and
  after identifying the given one of the two different event prediction models that provides the higher net value, causing a client station associated with a given user to present an indication that the given one of the two different event prediction models provides the higher net value.

15. The computer-implemented method of claim 14, further comprising:
  in response to identifying the given one of the two different event prediction models that provides the higher net value, deploying the given one of the two different event prediction models.

16. The computer-implemented method of claim 14, wherein determining the respective number of catches and the respective number of false flags produced by each of the two different event prediction models comprises determining a respective number of catch equivalents and a respective number of false-flag equivalents produced by each of the two different event prediction models, and wherein determining the respective number of catch equivalents and the respective number of false-flag equivalents produced by each respective event prediction model of the two different event prediction models comprises:

assigning each prediction in the respective set of predictions output by the respective event prediction model a respective potential-value score and a respective impact score;

determining the respective number of catch equivalents produced by the respective event prediction model by (1) identifying a first subset of the set of predictions output by the respective event prediction model that have been assigned positive potential-value scores, (2) for each respective prediction in the first subset, determining a respective actual-value score for the respective prediction by multiplying the respective potential-value score assigned to the respective prediction by the respective impact score assigned to the respective prediction, and (3) aggregating the respective actual-value scores for the respective predictions in the first subset to produce a total actual-value score for the first subset, wherein the total actual-value score for the first subset comprises the respective number of catch equivalents produced by the respective event prediction model; and determining the respective number of false-flag equivalents produced by the respective event prediction model by (1) identifying a second subset of the set of predictions output by the respective event prediction model that have been assigned negative potential-value scores, (2) for each respective prediction in the second subset, determining a respective actual-value score for the respective prediction by multiplying the respective potential-value score assigned to the respective prediction by the respective impact score assigned to the respective prediction, and (3) aggregating the respective actual-value scores for the respective predictions in the second subset to produce a total actual-value score for the second subset, wherein the total actual-value score for the second subset comprises the respective number of false-flag equivalents produced by the respective event prediction model.

17. A computer-implemented method carried out by a computing system, the method comprising:

using one or more machine learning techniques to train an event prediction model that is configured to preemptively predict event occurrences of a given type;

applying the event prediction model to a set of test data associated with known instances of actual event occurrences of the given type and thereby causing the event prediction model to output a set of predictions of whether an event occurrence of the given type is forthcoming;

evaluating the set of predictions output by the event prediction model using event windows for the known instances of actual event occurrences and thereby determining a number of catch equivalents and a number of false-flag equivalents produced by the event prediction model by:

assigning each prediction in the set of predictions output by the event prediction model a respective potential-value score and a respective impact score;

determining the number of catch equivalents produced by the event prediction model by (1) identifying a first subset of the set of predictions output by the event prediction model that have been assigned positive potential-value scores, (2) for each respective prediction in the first subset, determining a respective actual-value score for the respective prediction by multiplying the respective potential-value score assigned to the respective prediction by the respective impact score assigned to the respective prediction, and (3) aggregating the respective actual-value scores for the respective predictions in the first subset to produce a total actual-value score for the first subset, wherein the total actual-value score for the first subset comprises the number of catch equivalents produced by the event prediction model; and determining the number of false-flag equivalents produced by the event prediction model by (1) identifying a second subset of the set of predictions output by the event prediction model that have been assigned negative potential-value scores, (2) for each respective prediction in the second subset, determining a respective actual-value score for the respective prediction by multiplying the respective potential-value score assigned to the respective prediction by the respective impact score assigned to the respective prediction, and (3) aggregating the respective actual-value scores for the respective predictions in the second subset to produce a total actual-value score for the second subset, wherein the total actual-value score for the second subset comprises the number of false-flag equivalents produced by the event prediction model; and after determining the number of catch equivalents and the number of false-flag equivalents produced by the event prediction model, causing a client station associated with a given user to present an indication of the number of catch equivalents and the number of false-flag equivalents produced by the event prediction model.

18. The computer-implemented method of claim 17, further comprising:

using the number of catch equivalents and the number of false-flag equivalents produced by the event prediction model as a basis for comparing the event prediction model to one or more other event prediction models;

based on the comparing, determining that the event prediction model provides a higher net value than the one or more other event prediction models; and in response to the determining, deploying the event prediction model.

19. The computer-implemented method of claim 17, wherein assigning each prediction in the set of predictions output by the event prediction model the respective potential-value score comprises, for each respective prediction in the set of predictions:

if the respective prediction falls within any respective event window for any one of the known instances of actual event occurrences, assigning a maximum potential-value score to the respective prediction;

if the respective prediction falls within any ramp-up period that corresponds to any respective event window for any one of the known instances of actual event occurrences, assigning a potential-value score that is lower than the maximum potential-value score and higher than a minimum potential-value score to the respective prediction; or if the respective prediction does not fall within any respective event window or any corresponding ramp-up period for any one of the known instances of actual event occurrences within any ramp-up period that corresponds to any event respective window for any one of the known instances of actual event occurrences, assigning the minimum potential-value score to the respective prediction.

20. The computer-implemented method of claim 17, wherein assigning each prediction in the set of predictions output by the event prediction model the respective impact score comprises:

grouping the predictions in the set of predictions output by the event prediction model into alerts; and within each respective alert, (a) assigning each respective prediction in the respective alert that is positive a non-zero impact score in accordance with an exponential decay function that outputs a maximum impact score at the beginning point of the respective alert and then outputs a decaying impact score from the beginning point of the respective alert to the end point of the respective alert, and (b) assigning each respective prediction in the respective alert that is negative an impact score of zero.

* * * * *